United States Patent
Huang et al.

(10) Patent No.: US 11,281,515 B2
(45) Date of Patent: *Mar. 22, 2022

(54) METHOD AND SYSTEM FOR PROBLEM MODIFICATION AND PROCESSING

(71) Applicant: eBay Inc., San Jose, CA (US)

(72) Inventors: Qinping Huang, Sunnyvale, CA (US); Manish Maheshwari, Los Altos, CA (US); Amit Gupta, Dublin, CA (US); Maulin Vasavada, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,686

(22) Filed: Aug. 21, 2019

(65) Prior Publication Data

US 2020/0065178 A1 Feb. 27, 2020

Related U.S. Application Data

(63) Continuation of application No. 16/043,447, filed on Jul. 24, 2018, now Pat. No. 10,417,075, which is a continuation of application No. 14/872,367, filed on Oct. 1, 2015, now Pat. No. 10,055,271, which is a continuation of application No. 13/849,059, filed on Mar. 22, 2013, now Pat. No. 9,152,538, which is a continuation of application No. 11/852,163, filed on Sep. 7, 2007, now Pat. No. 8,407,686.

(51) Int. Cl.
| | |
|---|---|
| *G06F 11/07* | (2006.01) |
| *G06Q 10/06* | (2012.01) |
| *G06F 11/36* | (2006.01) |
| *G06F 9/44* | (2018.01) |

(52) U.S. Cl.
CPC ...... *G06F 11/0772* (2013.01); *G06F 11/0751* (2013.01); *G06F 11/366* (2013.01); *G06Q 10/06* (2013.01)

(58) Field of Classification Search
CPC ............. G06F 11/0772; G06F 11/0751; G06F 11/366; G06Q 10/06
USPC .................................................. 717/128, 131
See application file for complete search history.

(56) References Cited

U.S. PATENT DOCUMENTS

| | | | |
|---|---|---|---|
| 4,813,011 A | 3/1989 | Kulakowski et al. | |
| 4,922,491 A | 5/1990 | Coale | |

(Continued)

OTHER PUBLICATIONS

Response to Non-Final Office Action filed on Sep. 19, 2016, for U.S. Appl. No. 14/872,367, dated Jun. 17, 2016, 10 pages.

(Continued)

*Primary Examiner* — Chuck O Kendall
(74) *Attorney, Agent, or Firm* — Schwegman Lundberg & Woessner, P.A.

(57) ABSTRACT

A notification of a problem associated with an application may be received. A difference may be determined between a problem version of the application and an operational version of the application to identify a change associated with the problem. A person associated with the change may be determined. A task of resolving the problem may be assigned to the person associated with the change. A person may be notified of the problem and of the assigning of the task based on the identified change. A modification may be performed to resolve the problem associated with the change based on the determining of the difference.

20 Claims, 28 Drawing Sheets

(56) References Cited

U.S. PATENT DOCUMENTS

| | | | |
|---|---|---|---|
| 6,519,767 | B1 | 2/2003 | Carter et al. |
| 6,785,848 | B1 | 8/2004 | Glerum et al. |
| 7,028,019 | B2 | 4/2006 | McMillan et al. |
| 7,177,854 | B2 | 2/2007 | Chun et al. |
| 7,386,839 | B1 | 6/2008 | Golender et al. |
| 7,391,312 | B2 | 6/2008 | Murphy et al. |
| 7,516,438 | B1 | 4/2009 | Leonard et al. |
| 7,814,372 | B2 | 10/2010 | Huang et al. |
| 7,984,220 | B2 | 7/2011 | Gerard et al. |
| 8,407,686 | B2 | 3/2013 | Huang et al. |
| 8,516,470 | B1 | 8/2013 | van Rietschote et al. |
| 8,924,790 | B2 | 12/2014 | Huang et al. |
| 9,152,538 | B2 | 10/2015 | Huang et al. |
| 9,367,381 | B2 | 6/2016 | Huang et al. |
| 10,055,271 | B2* | 8/2018 | Huang ............... G06F 11/0772 |
| 10,417,075 | B2 | 9/2019 | Huang et al. |
| 2002/0157017 | A1 | 10/2002 | Mi et al. |
| 2003/0046664 | A1 | 3/2003 | Pangburn |
| 2003/0182414 | A1 | 9/2003 | O'neill |
| 2004/0260474 | A1 | 12/2004 | Malin et al. |
| 2005/0204200 | A1 | 9/2005 | Gadangi et al. |
| 2006/0112373 | A1 | 5/2006 | Rokosz |
| 2006/0282534 | A1 | 12/2006 | Berg |
| 2007/0285689 | A1 | 12/2007 | Hozumi |
| 2009/0070638 | A1 | 3/2009 | Huang et al. |
| 2009/0070733 | A1 | 3/2009 | Huang et al. |
| 2011/0055640 | A1 | 3/2011 | Huang et al. |
| 2011/0113414 | A1 | 5/2011 | Ewington et al. |
| 2013/0219375 | A1 | 8/2013 | Huang et al. |
| 2015/0154063 | A1 | 6/2015 | Huang et al. |
| 2016/0019109 | A1 | 1/2016 | Huang et al. |
| 2018/0329773 | A1 | 11/2018 | Huang et al. |
| 2020/0065178 | A1* | 2/2020 | Huang ............... G06F 11/366 |

OTHER PUBLICATIONS

Collier-Brown, "Sherlock Holmes on Log Files," Jun. 1, 2007, 5 pages.
Advisory Action received for U.S. Appl. No. 11/852,163, dated Aug. 31, 2012, 3 pages.
Final Office Action received for U.S. Appl. No. 11/852,163, dated May 18, 2012, 10 pages.
Non-Final Office Action received for U.S. Appl. No. 11/852,163, dated Oct. 25, 2011, 13 pages.
Notice of Allowance received for U.S. Appl. No. 11/852,163, dated Nov. 21, 2012, 8 pages.
Response to Final Office Action filed on Aug. 20, 2012, for U.S. Appl. No. 11/852,163, dated May 18, 2012, 10 pages.
Response to Non-Final Office Action filed on Jan. 25, 2012, for U.S. Appl. No. 11/852,163, dated Oct. 25, 2011, 11 pages.
Final Office Action received for U.S. Appl. No. 11/852,169, dated Mar. 18, 2010, 16 pages.
Non-Final Office Action received for U.S. Appl. No. 11/852,169, dated Oct. 1, 2009, 16 pages.
Notice of Allowance received for U.S. Appl. No. 11/852,169, dated Jun. 1, 2010, 4 pages.
Response to Final Office Action filed on May 18, 2010, for U.S. Appl. No. 11/852,169, dated Mar. 18, 2010, 6 pages.
Response to Non-Final Office Action filed on Jan. 4, 2010, for U.S. Appl. No. 11/852,169, dated Oct. 1, 2009, 14 pages.
Applicant Initiated Interview Summary received for U.S. Appl. No. 12/871,093, dated Jul. 21, 2014, 3 pages.
Applicant Initiated Interview Summary received for U.S. Appl. No. 12/871,093, dated Dec. 10, 2013, 3 pages.
Decision on Pre Appeal Brief received for U.S. Appl. No. 12/871,093, dated Oct. 16, 2012, 2 pages.
Final Office Action received for U.S. Appl. No. 12/871,093, dated Apr. 19, 2013, 7 pages.
Final Office Action received for U.S. Appl. No. 12/871,093, dated Feb. 13, 2014, 11 pages.
Final Office Action received for U.S. Appl. No. 12/871,093, dated Mar. 22, 2012, 10 pages.
Non-Final Office Action received for U.S. Appl. No. 12/871,093, dated Sep. 26, 2011, 10 pages.
Non-Final Office Action received for U.S. Appl. No. 12/871,093, dated Apr. 30, 2014, 12 pages.
Non-Final Office Action received for U.S. Appl. No. 12/871,093, dated Aug. 22, 2013, 11 pages.
Non-Final Office Action received for U.S. Appl. No. 12/871,093, dated Dec. 6, 2012, 6 pages.
Notice of Allowance received for U.S. Appl. No. 12/871,093, dated Aug. 26, 2014, 5 pages.
Response to Final Office Action filed on Apr. 3, 2014, for U.S. Appl. No. 12/871,093, dated Feb. 13, 2014, 10 pages.
Response to Final Office Action filed on Jul. 19, 2013, for U.S. Appl. No. 12/871,093, dated Apr. 19, 2013, 9 pages.
Response to Non-Final Office Action filed on Dec. 20, 2013, for U.S. Appl. No. 12/871,093, dated Aug. 22, 2013, 12 pages.
Response to Non-Final Office Action filed on Jan. 26, 2012, for U.S. Appl. No. 12/871,093, dated Sep. 26, 2011, 9 pages.
Response to Non-Final Office Action filed on Jul. 22, 2014 for U.S. Appl. No. 12/871,093, dated Apr. 30, 2014, 13 pages.
Response to Non-Final Office Action filed on Mar. 7, 2013, for U.S. Appl. No. 12/871,093, dated Dec. 6, 2012, 9 pages.
Non-Final Office Action received for U.S. Appl. No. 13/849,059, dated Aug. 15, 2014, 6 pages.
Notice of Allowance received for U.S. Appl. No. 13/849,059, dated Jun. 12, 2015, 8 pages.
Preliminary Amendment for U.S. Appl. No. 13/849,059, filed Nov. 14, 2013, 10 pages.
Response to Non-Final Office Action filed on Nov. 17, 2014, for U.S. Appl. No. 13/849,059, dated Aug. 15, 2014, 9 pages.
Applicant Initiated Interview Summary received for U.S. Appl. No. 14/553,673, dated Dec. 10, 2015, 3 pages.
Non-Final Office Action received for U.S. Appl. No. 14/553,673, dated Oct. 5, 2015, 14 pages.
Notice of Allowance received for U.S. Appl. No. 14/553,673, dated Feb. 18, 2016, 7 pages.
Preliminary Amendment received for U.S. Appl. No. 14/553,673, filed Dec. 3, 2014, 7 pages.
Response to Non-Final Office Action filed on Jan. 5, 2016, for U.S. Appl. No. 14/553,673, dated Oct. 5, 2015, 10 pages.
Advisory Action received for U.S. Appl. No. 14/872,367, dated Mar. 24, 2017, 2 pages.
Applicant Initiated Interview Summary received for U.S. Appl. No. 14/872,367, dated May 19, 2017, 3 pages.
Final Office Action received for U.S. Appl. No. 14/872,367, dated Jan. 11, 2018, 8 pages.
Final Office Action received for U.S. Appl. No. 14/872,367, dated Dec. 19, 2016, 9 pages.
Non-Final Office Action received for U.S. Appl. No. 14/872,367, dated Jun. 2, 2017, 9 pages.
Non-Final Office Action received for U.S. Appl. No. 14/872,367, dated Jun. 17, 2016, 7 pages.
Notice of Allowance received for U.S. Appl. No. 14/872,367, dated Apr. 20, 2018, 8 pages.
Preliminary Amendment for U.S. Appl. No. 14/872,367, filed Oct. 19, 2015, 10 pages.
Response to Final Office Action filed on Feb. 21, 2017, for U.S. Appl. No. 14/872,367, dated Dec. 19, 2016, 10 pages.
Response to Final Office Action filed on Mar. 7, 2018, for U.S. Appl. No. 14/872,367, dated Jan. 11, 2018, 12 pages.
Response to Final Office Action filed on May 18, 2017, for U.S. Appl. No. 14/872,367, dated Dec. 19, 2016, 11 pages.
Response to Non-Final Office Action filed on Aug. 30, 2017, for U.S. Appl. No. 14/872,367, dated Jun. 2, 2017, 10 pages.
Non-Final Office Action received for U.S. Appl. No. 16/043,447, dated Nov. 2, 2018, 7 pages.
Notice of Allowance received for U.S. Appl. No. 16/043,447, dated May 8, 2019, 7 pages.
Response to Non-Final Office Action filed on Feb. 1, 2019, for U.S. Appl. No. 16/043,447, dated Nov. 2, 2018, 7 pages.
U.S. Appl. No. 11/852,163, filed Sep. 7, 2007, Issued.

(56) References Cited

OTHER PUBLICATIONS

U.S. Appl. No. 13/849,059, filed Mar. 22, 2013, Issued.
U.S. Appl. No. 14/872,367, filed Oct. 1, 2015, Issued.
U.S. Appl. No. 16/043,447, filed Jul. 24, 2018, Issued.
U.S. Appl. No. 11/852,163 U.S. Pat. No. 8,407,686, filed Sep. 7, 2007, Method and System for Problem Notification and Processing.
U.S. Appl. No. 13/849,059 U.S. Pat. No. 9,152,538, filed Mar. 22, 2013, Method and System for Problem Notification and Processing.
U.S. Appl. No. 14/872,367 U.S. Pat. No. 10,055,271, filed Oct. 1, 2015, Method and System for Problem Modification and Processing.
U.S. Appl. No. 16/043,447 U.S. Pat. No. 10,417,075, filed Jul. 24, 2018, Method and System for Problem Modification and Processing.
U.S. Appl. No. 11/852,169 U.S. Pat. No. 7,814,372, filed Sep. 7, 2007, Method and System for Exception Detecting and Alerting.
U.S. Appl. No. 12/871,093 U.S. Pat. No. 8,924,790, filed Aug. 30, 2010, Method and System for Exception Detecting and Alerting.
U.S. Appl. No. 14/553,673 U.S. Pat. No. 9,367,381, filed Nov. 25, 2014, Method and System For Exception Detecting and Alerting.

\* cited by examiner

METHOD AND SYSTEM FOR PROBLEM MODIFICATION AND PROCESSING

RELATED APPLICATIONS

This application is a continuation of U.S. patent application Ser. No. 16/043,447, filed Jul. 24, 2018, which is a continuation of U.S. patent application Ser. No. 14/872,367, filed Oct. 1, 2015, which is a continuation of U.S. patent application Ser. No. 13/849,059, filed Mar. 22, 2013, which is a Continuation of U.S. patent application Ser. No. 11/852,163, filed Sep. 7, 2007, each of which is incorporated herein by reference in its entirety.

BACKGROUND

Problems may occur with the operation of an application for a variety of reasons. Typically, a developer or other person will search manually through logs of the application in an attempt to identify a cause of the problem.

BRIEF DESCRIPTION OF THE DRAWINGS

Some embodiments are illustrated by way of example and not limitation in the figures of the accompanying drawings in which.

DETAILED DESCRIPTION

Example methods and systems for problem notification and processing are described. In the following description, for purposes of explanation, numerous specific details are set forth in order to provide a thorough understanding of example embodiments. It will be evident, however, to one skilled in the art that the present invention may be practiced without these specific details.

In an example embodiment, notification of a problem associated with an application may be received. A difference between a problem version of the application and an operational version of the application may be determined to identify a change associated with the problem. A person associated with the change may be determined. A task of resolving the problem may be assigned to the person associated with the change. The person may be notified of the problem and of the assignment of the task based on the identified change.

In an example embodiment, notification of a problem associated with an application may be received. A difference between a problem version of the application and an operational version of the application may be determined to identify a change associated with the problem. A modification may be performed to resolve the problem associated with the change based on the determination of the difference.

In an example embodiment, a plurality of differences between a current version of an application and a prior version of the application may be determined. The plurality of differences may be stored. A request for a difference may be received. The requested difference may be accessed from the plurality of the materialized differences. The requested difference may be provided in response to the receiving of the request.

In an example embodiment, a difference request may be received through a user interface. An application associated with the difference request may be accessed. The application may include an output on the user interface from which the difference request was received. A difference associated with a current version of the application and a previous version of the application may be determined. The difference may be provided for presentation.

In an example embodiment, a request for a requested person associated with a version identifier of an application may be received. A plurality of persons associated with the version identifier may be accessed. The requested person may be identified from the plurality of persons based on a selection criterion. Identification of the requested person may be provided.

Figure 1:
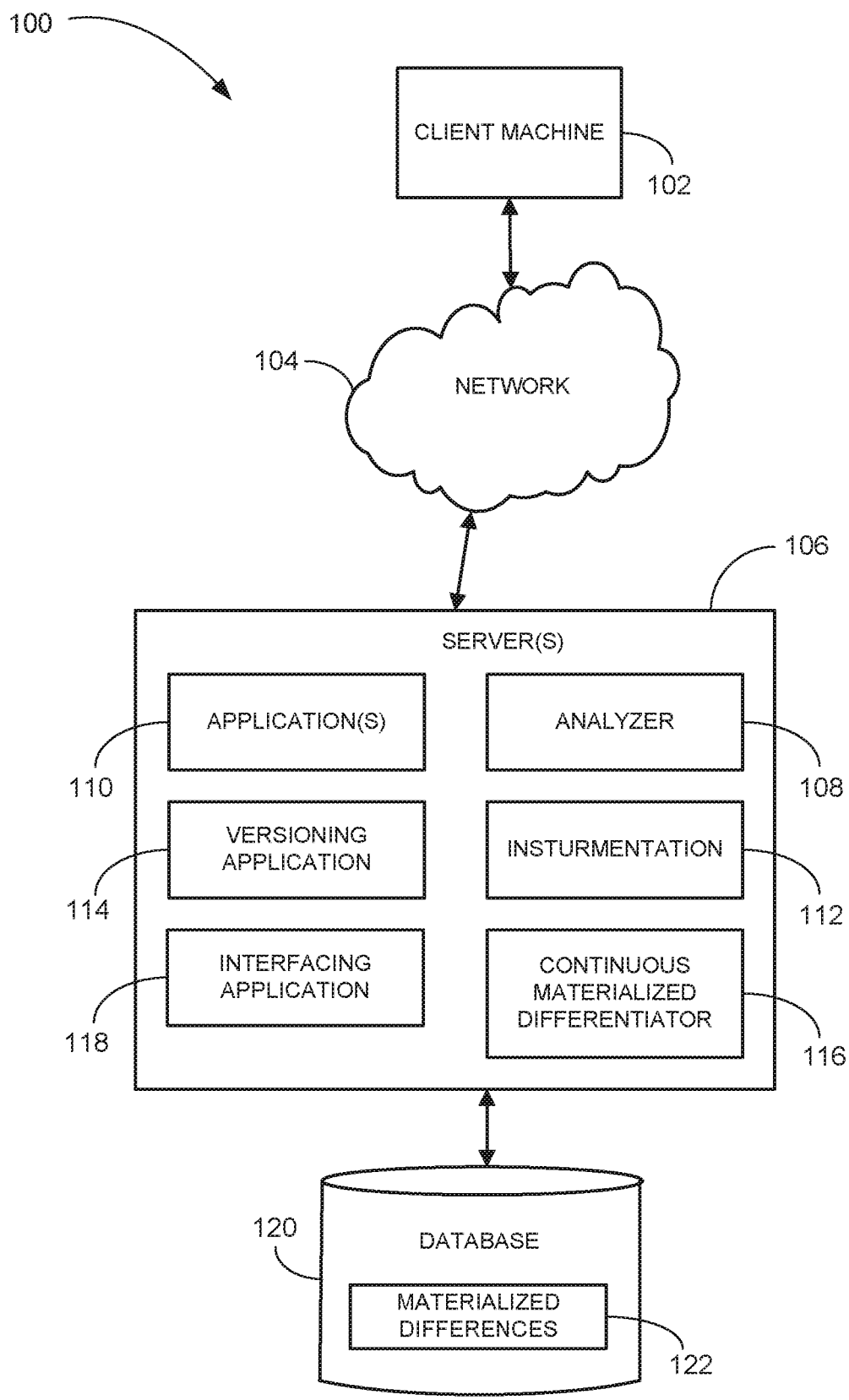
FIG. 1 is a block diagram of a system, according to an example embodiment.

FIG. 1 illustrates an example system 100 in which a client machine 102 may communicate with a server 106 through a network 104 to be provided with functionality from an application 110. An analyzer 108 may receive a notification regarding the application 110 and may notify a person regarding the problem and/or automatically resolve the problem. An example embodiment of the analyzer 108 is described in greater detail below.

The client machine 102 may be a computing system, mobile phone, a personal digital assistant (PDA), a gaming unit, a portable computing unit, and the like. The network 104 may be a Global System for Mobile Communications (GSM) network, an Internet Protocol (IP) network, a Wireless Application Protocol (WAP) network, a WiFi network, or an IEEE 802.11 standards network as well as various combinations thereof. Other conventional and/or later developed wired and wireless networks may also be used.

The application 110 may provide requested functionality to a user operating the client machine 102. The application 110 may include, by way of example, a billing application, a payment application, a listing application, a shipping application, and the like. Other types of applications may also be used. The application 110 may be written in JAVA programming language, C++ programming language, or otherwise written.

Instrumentation 112 may be used to log operations of the application 110. The resulting data may be used to determine a sequence of methods called by the application 110.

A versioning application 114 may track various versions of the application 110. For example, as an updated version of the application 110 is provided to the server 106, the versioning application 114 may track the update. The code of the application 110 may include a version identifier that may be used to distinguish one version of the application 110 from another.

A continuous materialized differentiator 116 may determine and store differences (e.g., changes to a method) of the application 110 as materialized differences 122 in a database 120. The materialized differences 122 may be stored with a time stamp. The materialized differences 122 may be stored based on a version identifier of the application 110. An interfacing application 118 may receive a request for a difference (e.g., through a user interface on the client machine 102) and provide the requested difference in response.

The analyzer 108, the application 110, the instrumentation 112, the versioning application 114, the continuous method differentiator 116, and the interfacing application 118 may all operate on a single server 106, on different servers 106, a number of servers 106, or be otherwise deployed.

Figure 2:
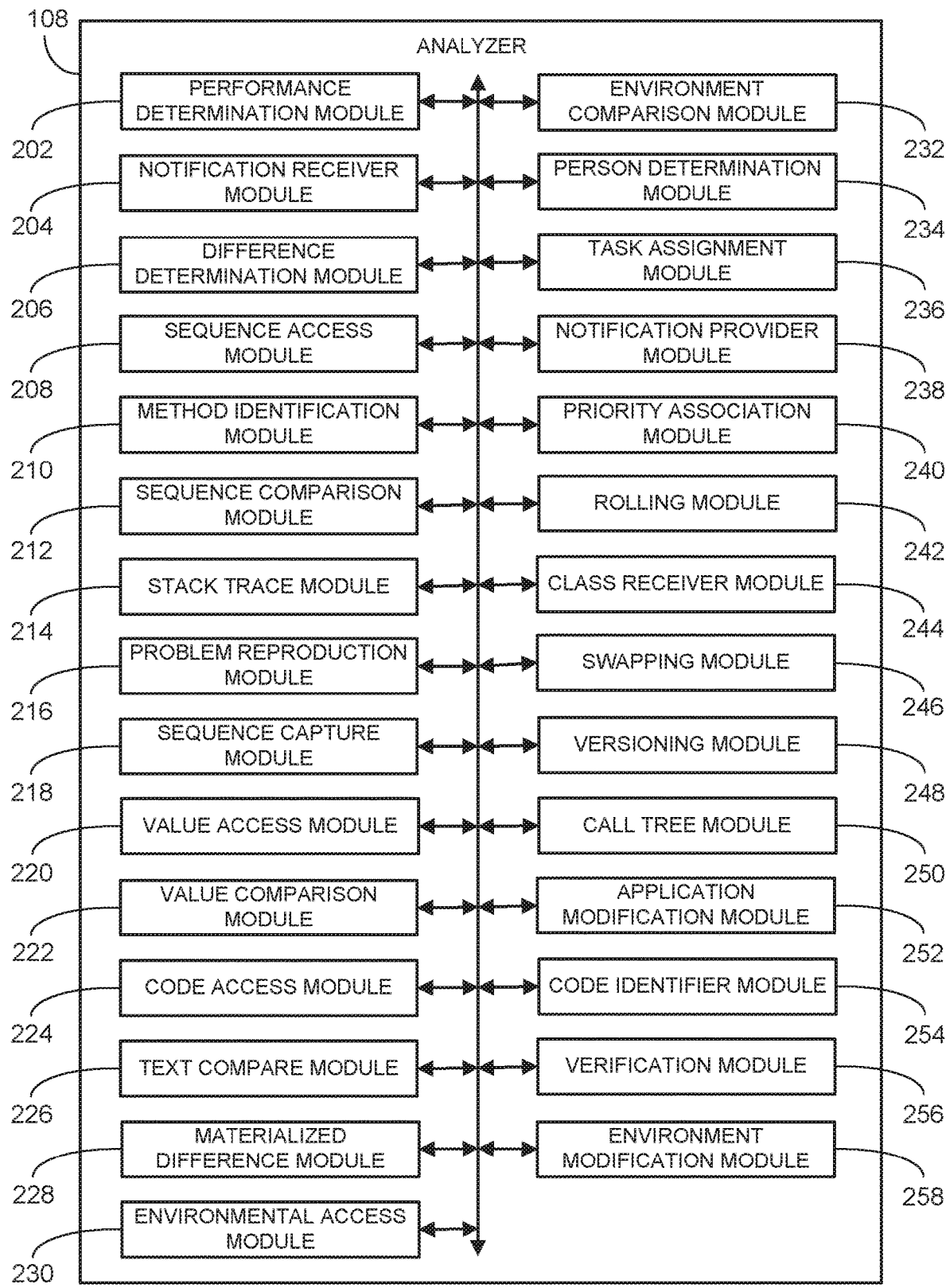
FIG. 2 is a block diagram of an example analyzer that may be deployed within the system of FIG. 1 according to an example embodiment.

FIG. 2 is an example of an analyzer 108 that may be deployed in the system 100 (see FIG. 1) or another system according to an example embodiment.

The analyzer 108 may include a performance determination module 202, a notification receiver module 204, a difference determination module 206, a sequence access module 208, a method identification module 210, a sequence comparison module 212, a stack trace module 214, a problem reproduction module 216, a sequence capture module 218, a value access module 220, a value comparison module 222, a code access module 224, a compare module 226, a materialized difference module 228, an environmental access module 230, an environment comparison module 232, a person determination module 234, a task assignment module 236, a notification provider module 238, a priority association module 240, a rolling module 242, a class receiver module 244, a swapping module 246, a versioning module 248, a call tree module 250, an application modification module 252, a code identifier module 254, a verification module 256, and/or an environment modification module 258. Other modules may also be used.

The performance determination module 202 determines a performance difference between the problem version of the application 110 and the operational version of the application 110.

The notification receiver module 204 receives notification of a problem associated with an application 110. The notification may be an alert or a different type of notification. The problem may be a performance problem with the application 110, a defect problem with the application 110, a feature failure, an error rate of the application 110 is too high, or the like. The problem associated with the application 110 may be based on a determination of a performance difference.

The difference determination module 206 determines a difference between a problem version of the application 110 and an operational version of the application 110 to identify a change (e.g., an identified change) associated with the problem. The difference may be a file difference, a method difference, and/or a class difference between a method of the problem version of the application and the operational version of the application. The difference may be an environmental difference between the current version of the application and the previous version of the application.

The difference determination module 206 may determine the difference associated with a modified version of the application 110 and the operational version of the application 110 to identify an additional change associated with the problem.

The difference determination module 206 may obtain a difference between a method of the problem version of the application 110 and the operational version of the application 110.

The sequence access module 208 accesses a sequence of methods associated with the problem from the problem version of the application 110 and/or from a corresponding operation of the operational version of the application 110.

The method identification module 210 identifies a method of the sequence of methods that has been changed between the operational version of the application 110 to the problem version of the application 110.

The sequence comparison module 212 compares the sequence of methods associated the problem version and the operational version of the application 110 to determine the change in a flow of the sequence of methods.

The stack trace module 214 accesses (e.g., from an alert or a log created by the instrumentation 112) a portion of a stack trace associated with the problem of the application 110. The stack trace may include the sequence of methods. The problem reproduction module 216 reproduces the problem associated with the application 110. The sequence capture module 218 captures the sequence of the methods of the application 110 during reproduction of the problem.

The value access module 220 accesses a data value of an accessed method of the sequence of methods of the problem version and the operational version of the application 110. The data value may include, by way of example, a parameter, a local variable, a global variable, a method variable, a class variable, an instant variable, or a return value (e.g., from a method). Other data values may also be used. The value comparison module 222 compares a data value of the accessed method of the operational version of the application 110 to the problem version of the application 110 to identify a method of the sequence of methods that has been changed.

The code access module 224 accesses code of the problem version of the application 110 and the operational version of the application 110. The compare module 226 performs a compare on the code of the problem version of the application 110 and the code of the operational version of the application 110 to obtain a result (e.g., an identified change). The code may be source code, compiled code, bytecode, or a different type of code.

The materialized difference module 228 accesses a materialized file difference (e.g., an identified change) between the method of the problem version of the application 110 and the operational version of the application 110 from the materialized differences 122. The materialized difference may be a materialized file difference, a materialized method difference, materialized class difference, and/or a configuration difference. Other materialized differences may also be accessed.

The environmental access module 230 accesses an environment (e.g., a configuration) associated with the problem version of the application 110 and the environment associated with the operational version of the application 110.

The environment comparison module 232 compares the environment attributes associated the problem version and the operational version of the application 110 to determine an environmental change (e.g., an identified change).

The person determination module 234 determines a person associated with the change. The task assignment module 236 assigns a task of resolving the problem to a person associated with the change.

The notification provider module 238 notifies a person of the problem and/or of the assignment of the task based on the identified change. The notification may include a method difference, a file difference, a class difference, configuration difference, or combinations thereof; notifies a person associated with the change of the modification. The notification of the problem may include the alert. The alert may include a link to the stack trace. The notification may include a priority for resolution. The notification may include an indication of the rolling back of the application.

The priority association module 240 associates a priority for resolution of the problem. The rolling module 242 rolls back the application 110 from the problem version to the operational version. The roll back may be based on the priority for resolution.

The class receiver module 244 receives an updated class for the problem version of the application 110. The swapping module 246 hot swaps the updated class into the problem version of the application 110. The hot swapping may include providing the updated class into the problem version of the application 110 while the application 110 is still running.

The versioning module 248 updates the versioning application 114 based on the hot swapping of the updated class, tests an updated version of the application 110 to determine whether the updated version includes the existing problem and/or a new problem, accesses a version identifier associated with the problem version of the application 110; provides a person request to a versioning application 114, and/or receives identification of the person from the versioning application 114. The person request may include a method that has been changed by the person.

The call tree module 250 accesses a call tree for the problem associated with the application 110. The call tree may indicate an additional method called by a method of the sequence of methods. The call tree may be used to determine an additional person along with the original person for notification.

The application modification module 252 performs a modification to resolve the problem associated with the change based on the determining of the difference, performs the modification on the problem version of the application 110 to create a modified version of the application 110, and/or performs an additional modification on the modified version of the application 110 to resolve the problem associated with the change.

The code identifier module 254 accesses a code identifier for a method of the sequence of methods and identifies methods for the determining of the difference based on use of the code identifier.

The verification module 256 compares an output from the modified version of the application 110 with the operational version of the application 110 to confirm that the problem associated with the change is not present in the modified version.

The environment modification module 258 modifies an environment of a machine (e.g., the server 106, a machine on which the server 106 is running, or an application running on the server 106) operating the problem version of the application 110 and/or the problem version of the application 110 to resolve the problem associated with the change.

Figure 3:
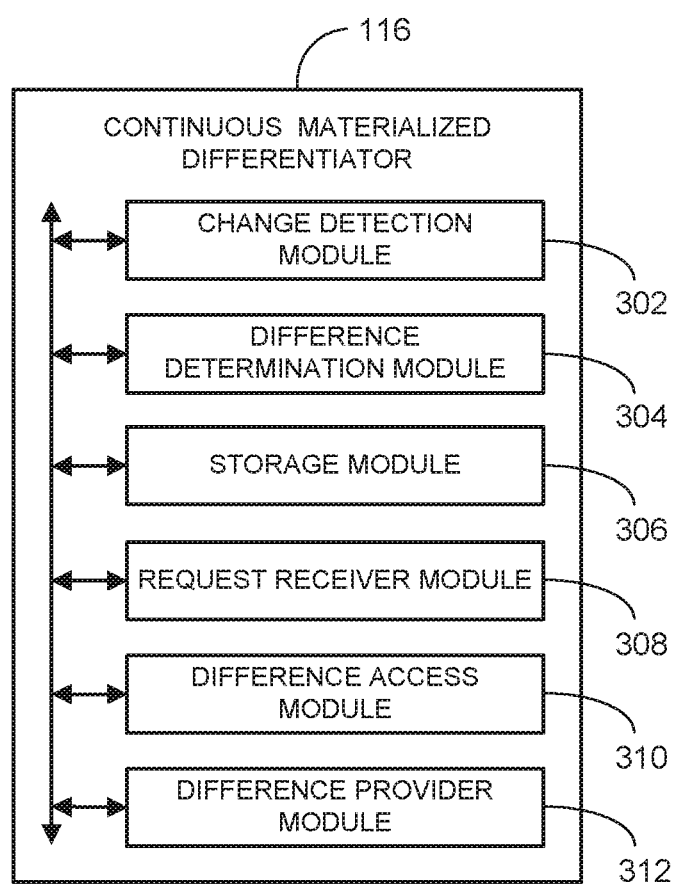
FIG. 3 is a block diagram of an example continuous materialized differentiator that may be deployed within the system of FIG. 1 according to an example embodiment.

FIG. 3 is an example of a continuous materialized differentiator 116 that may be deployed in the system 100 (see FIG. 1) or another system according to an example embodiment.

The continuous materialized differentiator 116 may include a change detection module 302, difference determination module 304, a storage module 306, a request receiver module 308, a difference access module 310, and/or a difference provider module 311. Other modules may also be used.

The change detection module 302 detects a change associated with the application 110. The difference determination module 304 determines differences between a current version of an application 110 and a prior version of the application 110. The storage module 306 stores the differences as materialized differences 122 in the database 120 and/or in other storage. For example, the other storage may be memory in which the materialized differences 122 are indexed or otherwise retained.

The request receiver module 308 receives a request for a requested difference. The difference access module 310 accesses the requested difference from the materialized differences 122. The difference provider module 312 provides the requested difference in response to the receiving of the request.

Figure 4:
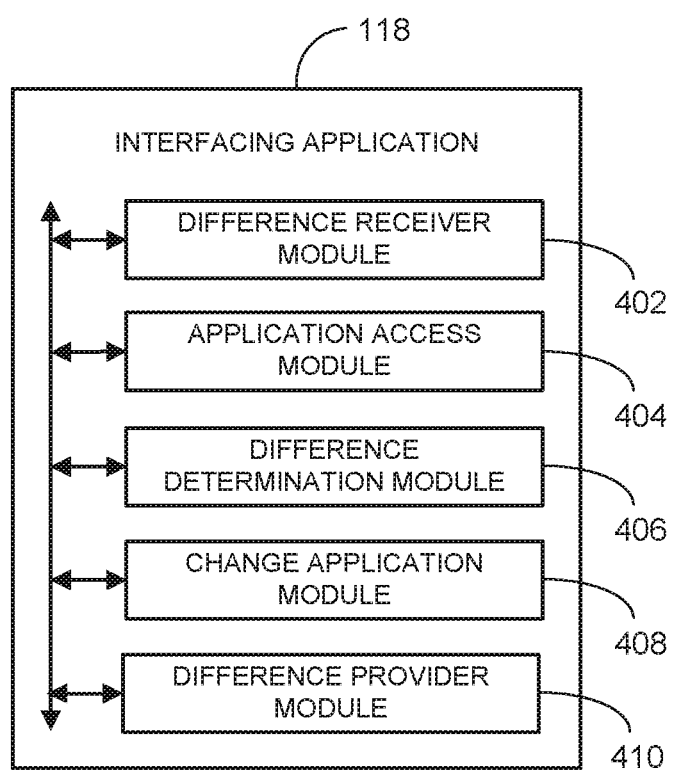
FIG. 4 is a block diagram of an example interfacing application that may be deployed within the system of FIG. 1 according to an example embodiment.

FIG. 4 is an example of an interfacing application 118 that may be deployed in the system 100 (see FIG. 1) or another system according to an example embodiment.

The interfacing application 118 may include a difference receiver module 402, an application access module 404, a difference determination module 406, a change application module 408 and/or a difference provider module 410. Other modules may also be used.

The difference receiver module 402 receives a difference request through a user interface (e.g., of the client machine 102).

The application access module 404 accesses the application 110 associated with the difference request. The application 110 may include an output on the user interface from which the difference request was received.

The difference determination module 406 determines a difference associated with a current version of the application 110 and a previous version of the application 110. The change application module 408 applies the change to the current version of the application 110. The difference provider module 410 provides the difference for presentation.

Figure 5:
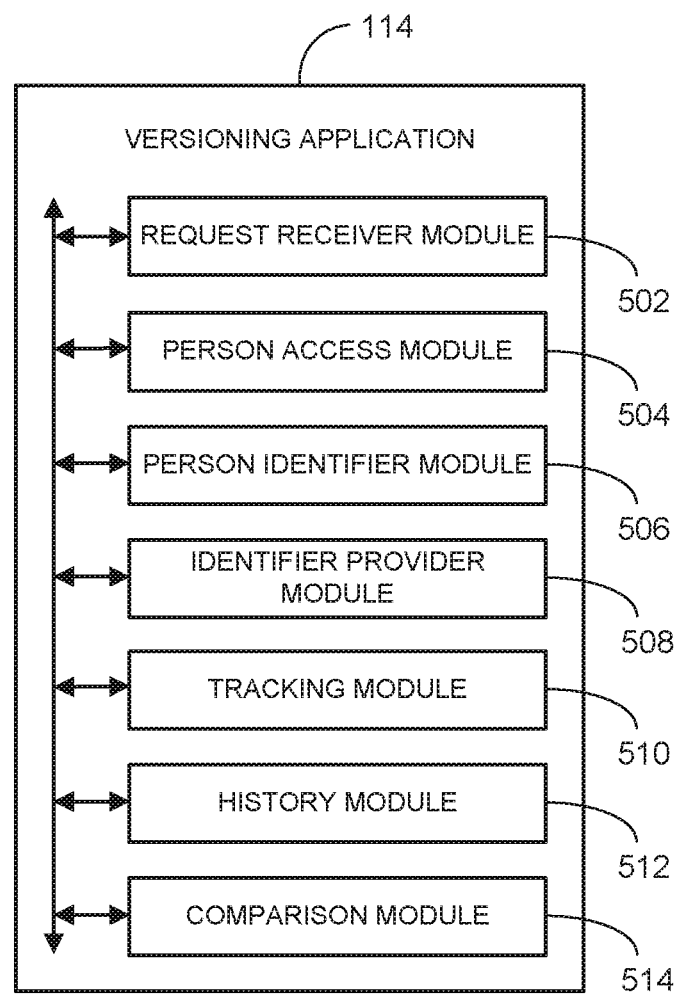
FIG. 5 is a block diagram of an example versioning application that may be deployed within the system of FIG. 1 according to an example embodiment.

FIG. 5 is an example of a versioning application 114 that may be deployed in the system 100 (see FIG. 1) or another system according to an example embodiment.

The versioning application 114 may include a request receiver module 502, a person access module 504, a person identifier module 506, a identifier provider module 508, a tracking module 510, a history module 512, and/or a comparison module 514. Other modules may also be included.

The request receiver module 502 receives a request for a requested person associated with a version identifier of the application 110. The person access module 504 accesses persons associated with the version identifier.

The person identifier module 506 identifies the requested person from the persons based on a selection criterion. The selection criterion may include, by way of example, a greatest number of changes to the application, a greatest knowledge of the application, association with a last method change in a sequence of methods, association with a first method change in the sequence of methods, association with a method change in the sequence of methods occurring before detection of the exception, and/or a manual examination of the change. Other selection criteria may also be used.

The identifier provider module 508 provides identification of the requested person.

The tracking module 510 tracks changes to the application 110. The history module 512 access history of the changes to the application 110. The comparison module 514 compares versions of the application 110 and/or application components (e.g., modules of the application 110).

Figure 6:
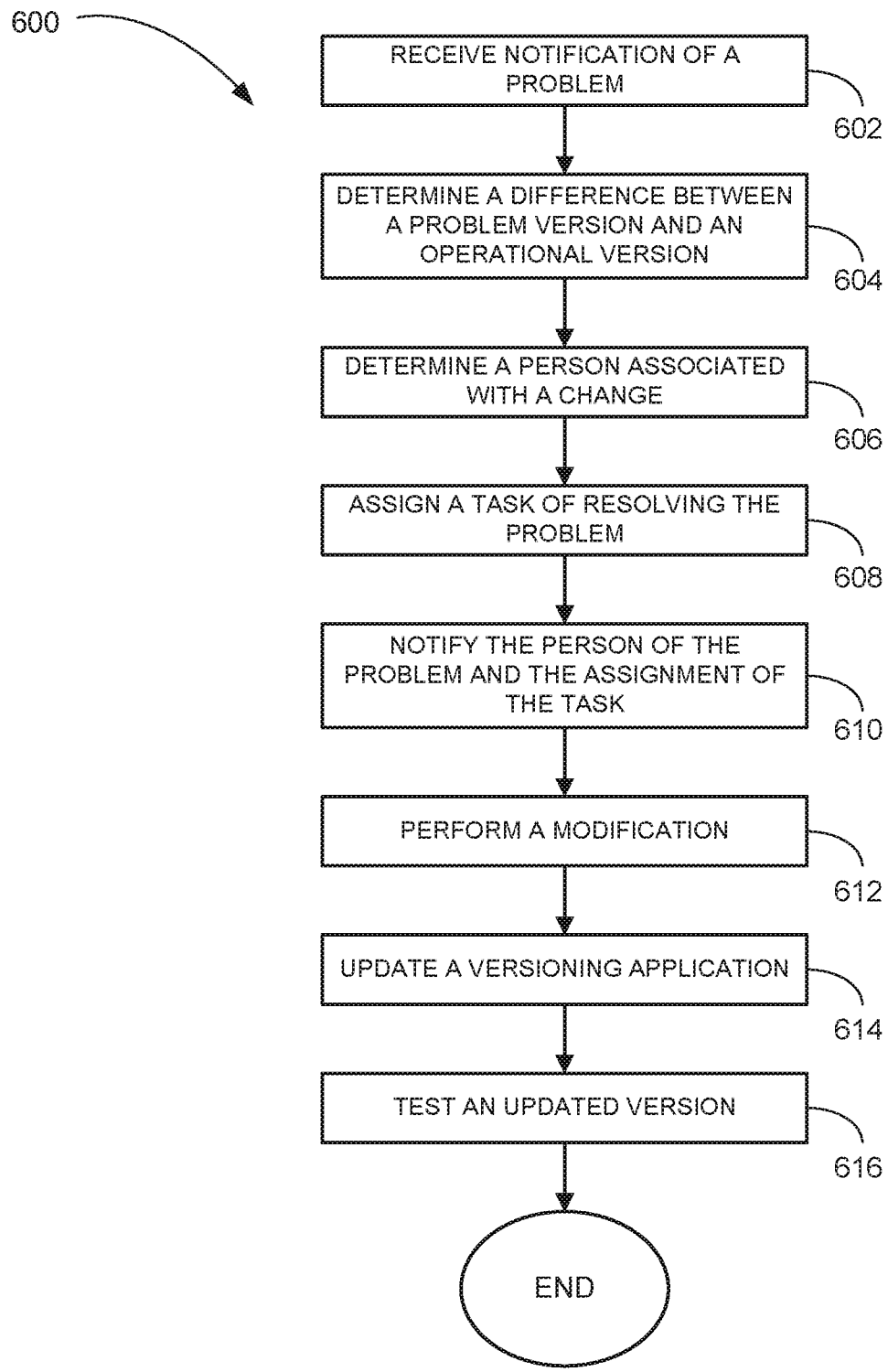
FIG. 6 is a flowchart illustrating a method for notifying according to an example embodiment.

FIG. 6 illustrates a method 600 for notifying according to an example embodiment. The method 600 may be performed by the analyzer 108 (see FIG. 1) or another application in the system 100 or another system.

Notification of a problem associated with the application 110 is received at block 602. The notification may be an alert for the problem associated with the application 110. The alert may be received or an exception for the application 110 may be received and an alert for the exception may be generated. The alert may include a new exception alert, a rater alert or a different type of alert.

The problem may be a performance problem with the application 110, a defect problem with the application 110, a feature failure, an error rate of the application 110 is too high, and the like.

In an example embodiment, the problem associated with the application 110 may be based on a determination of a performance difference. For example, a performance difference between the problem version of the application 110 and the operational version of the application 110 may be determined.

In an example embodiment, the problem version of the application 110 may be a current version of the application and the operational version of the application may be a previous version of the application 110.

In an example embodiment, the problem version of the application 110 may be the current version of the application 110 running on a first machine and the operational version of the application 110 may be the current version of the application running 110 on a second machine.

At block 604, a difference between a problem version of the application 110 and an operational version of the application 110 is determined to identify a change associated with the problem. The change may include a method change, a database change, an environmental change, or the like. By way of an example, the environmental change may include altering at memory, a number of machines, an amount of memory used, a firewall, adding a new machine, or combinations thereof. The difference may be, by way of example, an environmental difference, a database difference, a class difference, a flow difference, or the like.

A person associated with the change is determined at block 606.

At block 608, a task of resolving the problem is assigned to the person associated with the change.

At block 610, the person is notified of the problem and of the assigning of the task based on the identified change. The notifying of the person may include notification of a method difference, a file difference, a class difference, an environmental difference, or the like. The person may be a developer, an administrator or other type of person.

A modification may be performed at block 612 to resolve the problem associated with the change. The modification may be provided by a person or otherwise provided.

At block 614, the versioning application 114 may be updated based on the hot swapping of the updated class.

At block 616, an updated version of the application 110 may be tested to determine whether the updated version includes an existing problem and/or a new problem. The updated version of the application 110 may include the problem version of the application 110 with the updated version of the class.

In an example embodiment, a call tree for the problem associated with the application 110 may be accessed. The call tree may indicate an additional method called by a method of the sequence of methods. The determining of the person may include a person associated with the change and an additional person associated with the additional method. The additional person may then be notified with the original person.

Figure 7:
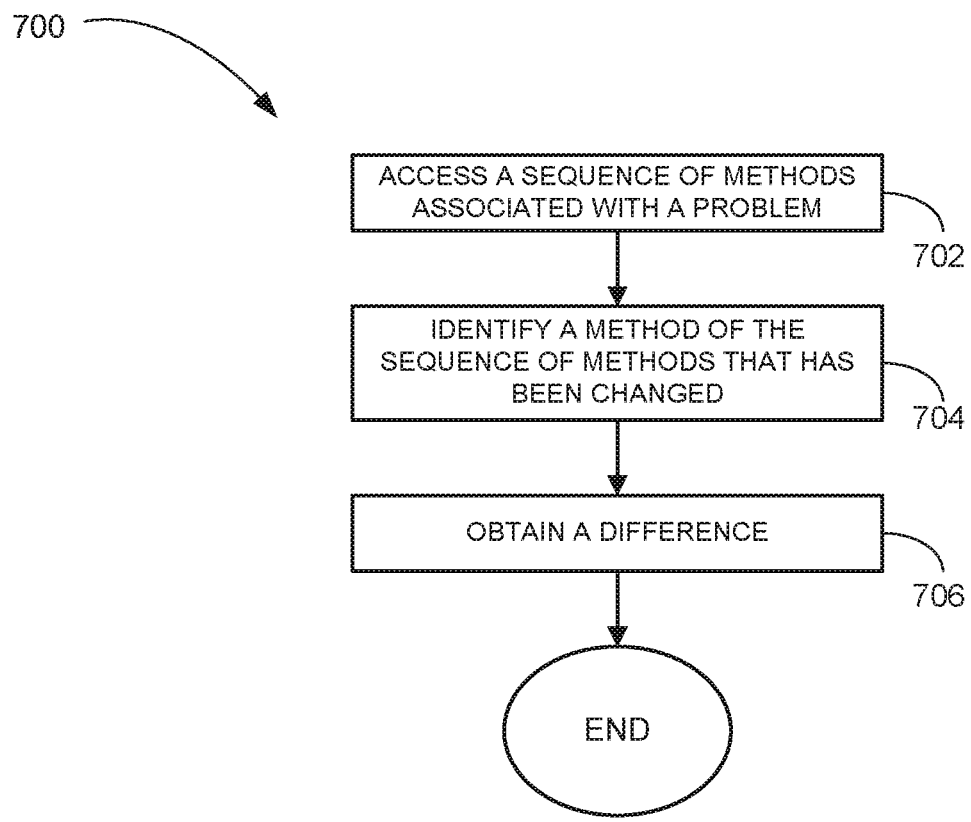
FIG. 7 is a flowchart illustrating a method for determining a difference according to an example embodiment.

FIG. 7 illustrates a method 700 for determining a difference according to an example embodiment. The method 700 may be performed at block 604 (see FIG. 6) or otherwise performed.

A sequence of methods associated with the problem from the problem version of the application 110 is accessed at block 702.

At block 704, a method of the sequence of methods that has been changed between the operational version of the application 110 and the problem version of the application 110 is identified.

A difference between the method of the problem version of the application and the operational version of the application is obtained at block 706. The identified change of the operations at block 706 may be the difference.

In an example embodiment, the difference may be obtained by accessing a stored file difference, a stored method difference, and/or a stored class difference between a method of the problem version of the application 110 and the operational version of the application 110 from the materialized differences 122. The accessed stored difference may be an identified change of the application 110.

Figure 8:
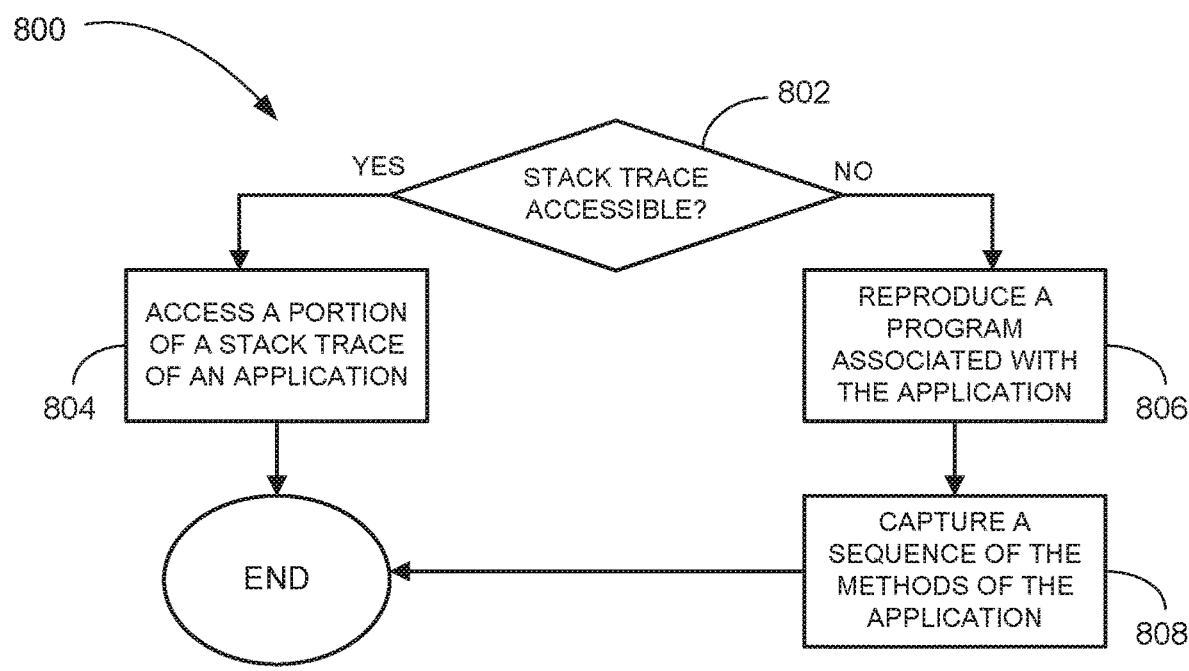
FIG. 8 is a flowchart illustrating a method for accessing a sequence according to an example embodiment.

FIG. 8 illustrates a method 800 for accessing a sequence according to an example embodiment. The method 800 may be performed at block 702 (see FIG. 7) or otherwise performed.

At decision block 802, a determination may be made as to whether a stack trace is accessible. If a determination is made that the stack trace is accessible, a portion of a stack trace associated with the problem of the application 110 may be accessed (e.g., from an alert or a log file) at block 804. The stack trace may include the sequence of methods. Each method in the sequence of methods may include a file name (e.g., to identify a location of the code) and a line number.

If a determination is made at decision block 802 that the stack trace is not accessible, the problem associated with the application 110 may be reproduced at block 806. At block 808, the sequence of the methods of the application 110 may then be captured during the reproduction of the problem.

In an example embodiment, the operations performed at block 806 and block 808 may be when a user has notified an operator of the problem but that the stack trace is inaccessible.

Figure 9:
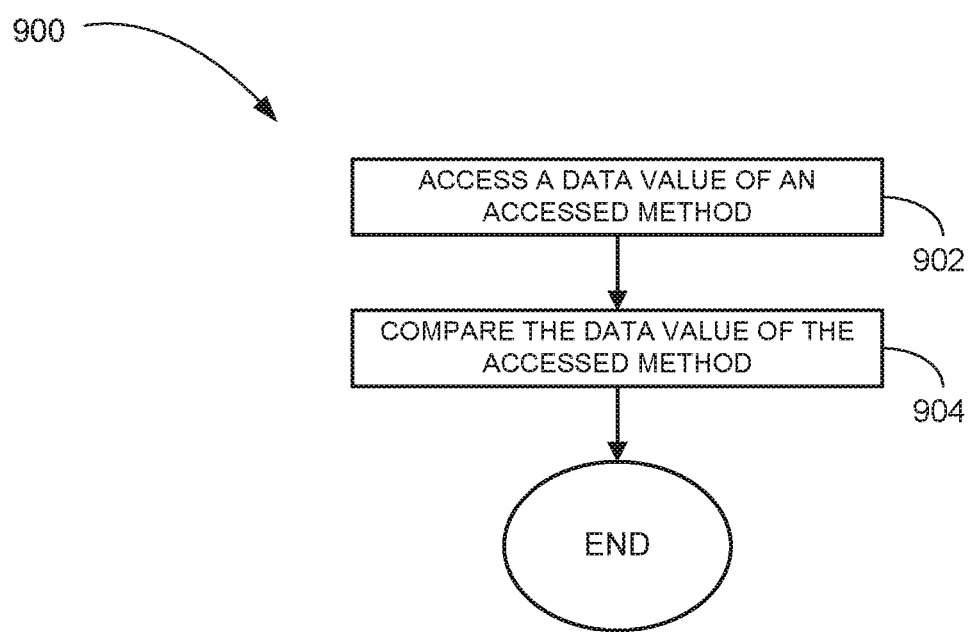
FIG. 9 is a flowchart illustrating a method for identifying a method of a sequence according to an example embodiment.

FIG. 9 illustrates a method 900 for identifying a method of a sequence according to an example embodiment. The method 900 may be performed at block 704 (see FIG. 7) or otherwise performed.

At block 902, a data value of an accessed method of the sequence of methods of the problem version and the operational version of the application 110 is accessed. The data value may include, by way of example, a parameter, a local variable, a global variable, a method variable, a return value (e.g., from a method), a class variable, and/or an instant variable. Other data values may also be used.

At block 904, the data value of the accessed method of the operational version is compared to the problem version to identify a method of the sequence of methods that has been changed.

Figure 10:
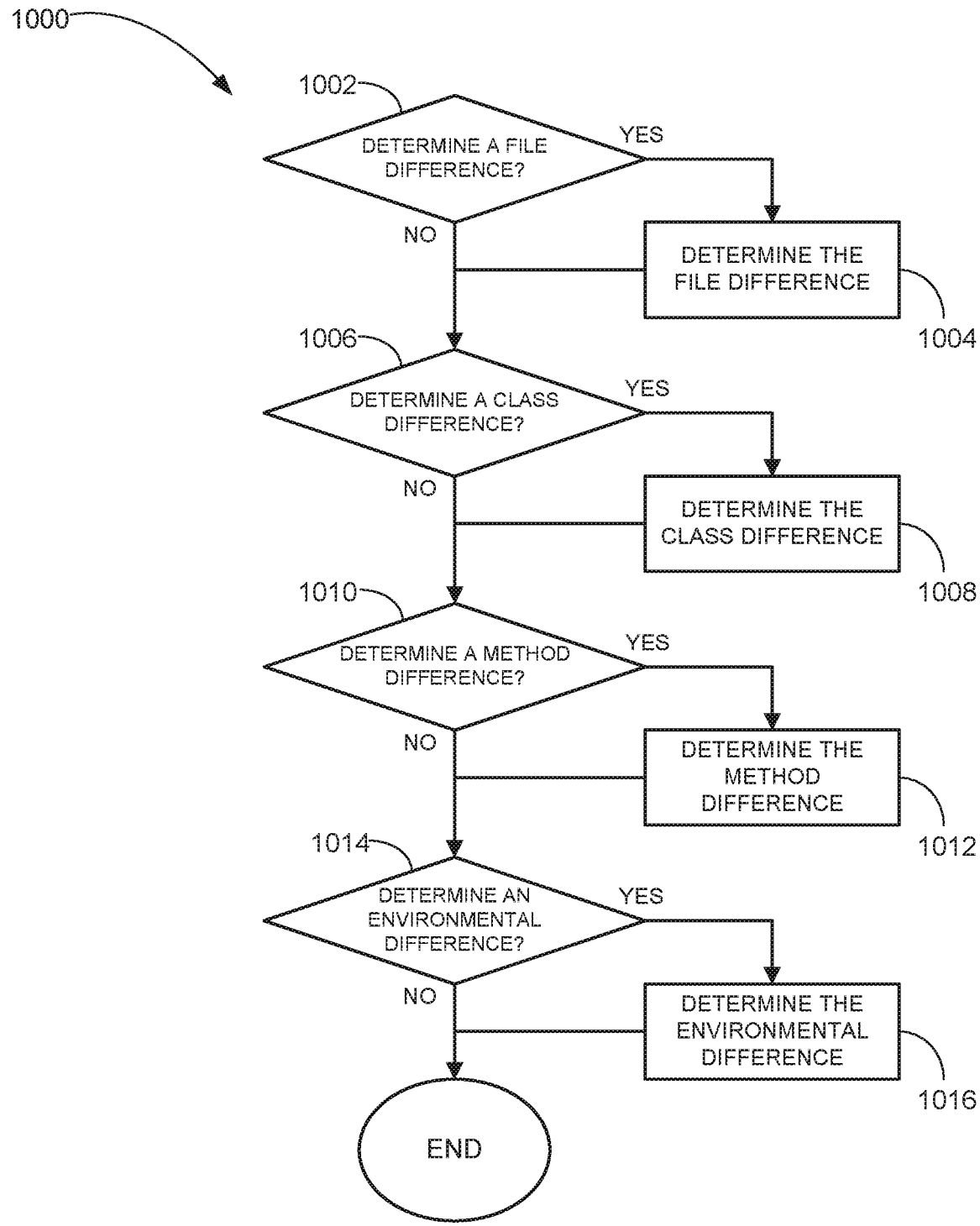
FIG. 10 is a flowchart illustrating a method for obtaining a difference according to an example embodiment.

FIG. 10 illustrates a method 1000 for obtaining a difference to an example embodiment. The method 1000 may be performed at block 706 (see FIG. 7) or otherwise performed. The method 1000 may be used to make a single type of difference and/or multiple differences. For example, determinations may be made during the method 1000 based on a selected type of difference.

A determination may be made at decision block 1002 whether to determine a file difference. If a determination is made to determine the file difference, a file difference between a file of the problem version of the application 110 and the operational version of the application may be determined at block 1004. If a determination is made at decision block 1002 not to determine the file difference or upon completion of the operations at block 1004, the method 1000 may proceed to decision block 1006.

At decision block 1006, a determination may be made whether to determine a class difference. If a determination is made to determine the class difference, a class difference between the method of the problem version of the application and the operational version of the application may be determined at block 1008. If a determination is made at decision block 1006 not to determine the class difference or upon completion of the operations at block 1008, the method 1000 may proceed to decision block 1010.

A determination may be made at decision block 1010 whether to determine a method difference. If a determination is made to determine the method difference, a method difference between the method of the problem version of the application 110 and the operational version of the application 110 may be determined at block 1012. If a determination is made at decision block 1010 not to determine the method difference or upon completion of the operations at block 1012, the method 1000 may proceed to decision block 1014.

At decision block 1014, a determination may be made whether to determine an environmental difference. If a determination is made to determine the environmental difference, an environmental difference between the current version of the application 110 and the previous version of the application 110 may be determined at block 1016. If a determination is made at decision block 1014 not to determine the environmental difference or upon completion of the operations at block 1004, the method 1000 may terminate.

In an example embodiment, the method 1000 may be performed to first determine whether a change has occurred with a file (e.g., containing the code for the application 110). When a change is determined to have occurred, the method 1000 may then seek to identify one or more classes in the file that have been changed. For the classes that have changed, the method 1000 may then seek to identify one or more methods in the one or more classes that have changed.

In an example embodiment, the operations performed at decision blocks 1002, 1006, 1010, 1014 may occur in any order.

Figure 11:
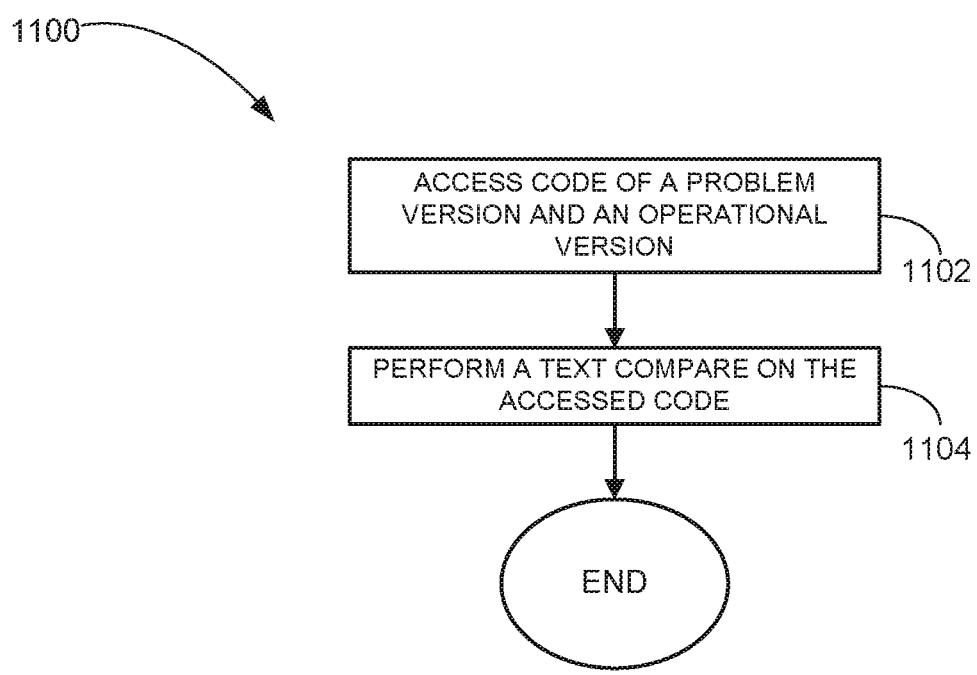
FIG. 11 is a flowchart illustrating a method for determining a file difference according to an example embodiment.

FIG. 11 illustrates a method 1100 for determining a file difference according to an example embodiment. The method 1100 may be performed at block 1012 (see FIG. 10) or otherwise performed.

Code of the problem version of the application 110 and the operational version of the application 110 is accessed at block 1102. The code may be source code, compiled code, bytecode, and the like.

At block 1104, a compare is performed on the accessed code of the problem version of the application 110 and the accessed code of the operational version of the application 110 to obtain a result (e.g., an identified change). The compare may be a text compare, a binary compare, or a different type of compare.

Figure 12:
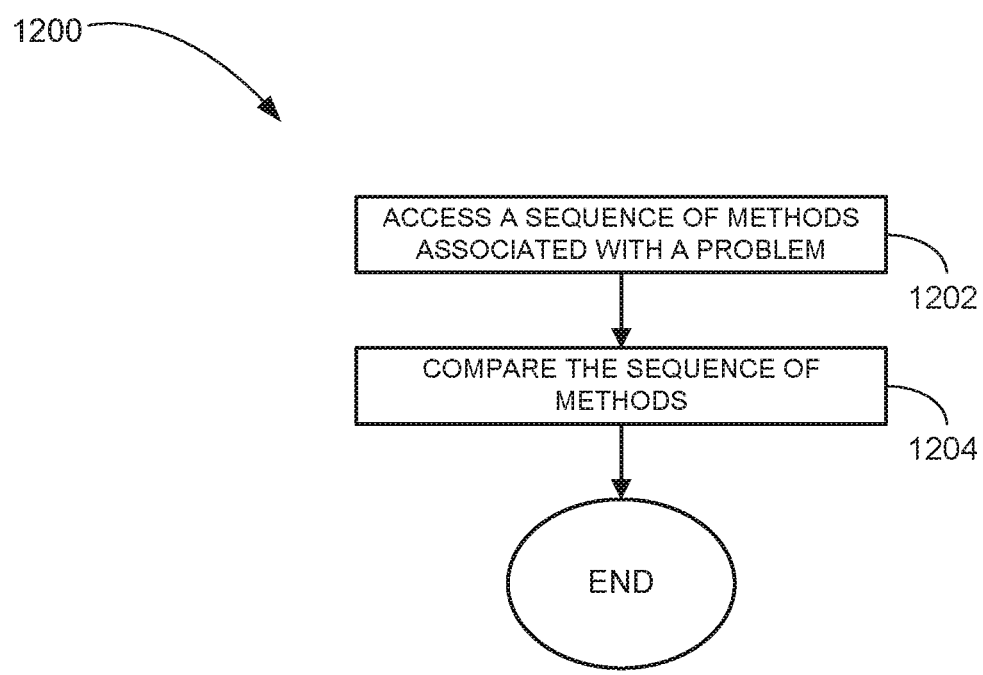
FIGS. 12-14 are flowcharts illustrating a method for determining a difference according to an example embodiment.

FIG. 12 illustrates a method 1200 for determining a difference according to an example embodiment. The method 1200 may be performed at block 604 (see FIG. 6) or otherwise performed.

At block 1202, a sequence of methods associated with the problem is accessed from the problem version of the application 110 and from a corresponding operation of the operational version of the application 110.

At block 1204, the sequence of methods associated the problem version is compared to the operational version to determine the change in a flow of the sequence of methods (e.g., the identified change).

Figure 13:
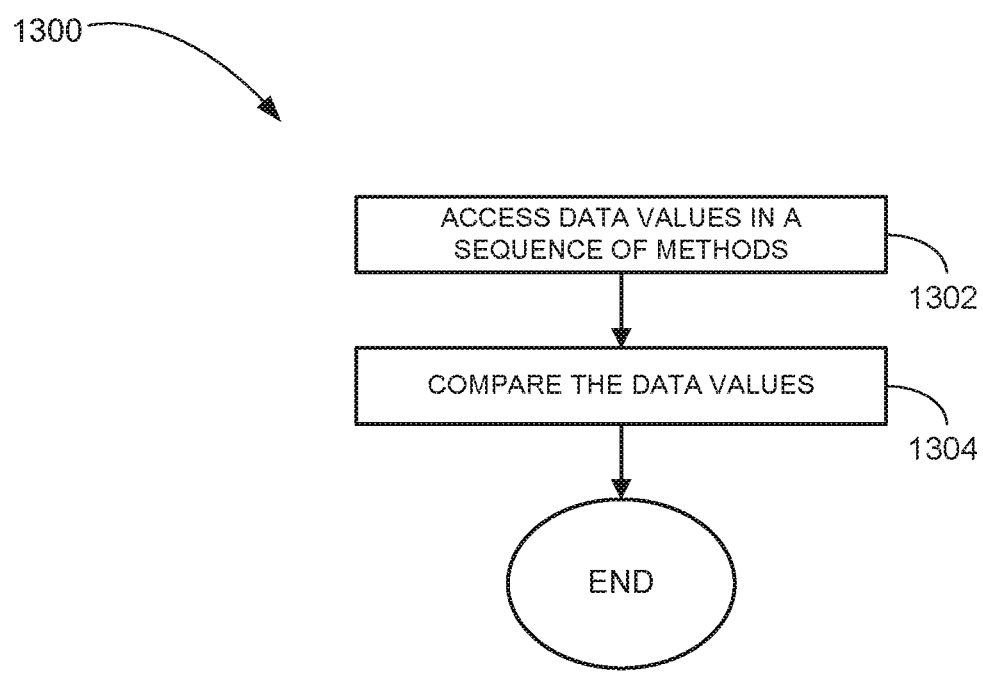

FIG. 13 illustrates a method 1300 for determining a difference according to an example embodiment. The method 1300 may be performed at block 604 (see FIG. 6) or otherwise performed.

At block 1302, one or more data values of a sequence of methods associated with the problem is accessed from the problem version of the application 110 and from a corresponding portion of the operational version of the application 110. The data values may have been captured by the instrumentation 112 (see FIG. 1) or otherwise accessed.

At block 1304, the accessed data values of the problem version are compared to the accessed data values of the operational version to determine the change in data values (e.g., the identified change).

Figure 14:
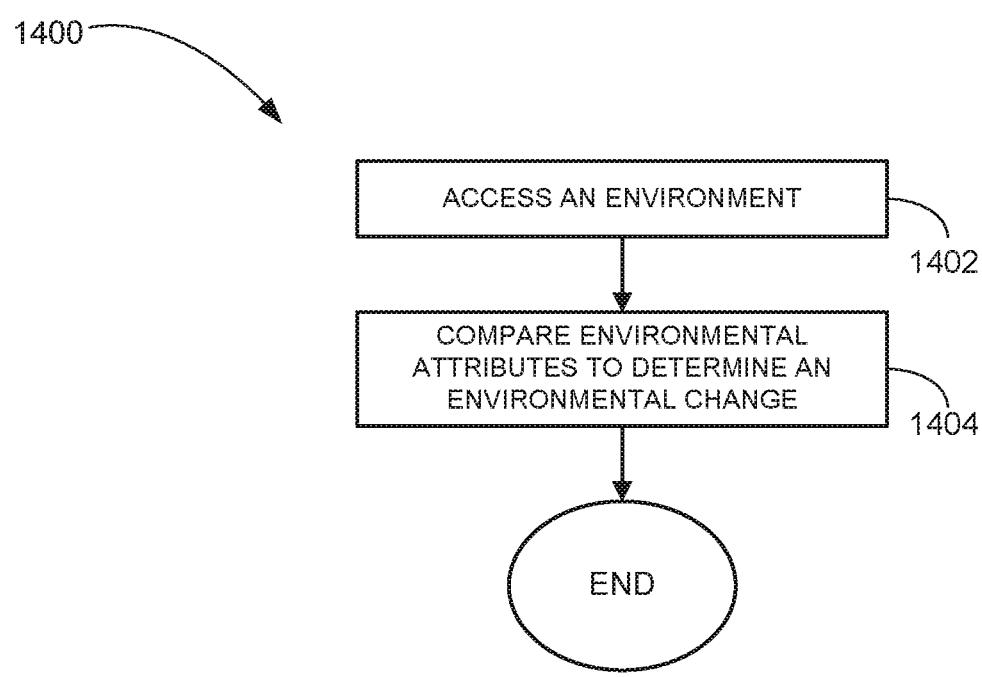

FIG. 14 illustrates a method 1400 for determining a difference according to an example embodiment. The method 1400 may be performed at block 604 (see FIG. 6) or otherwise performed.

At block 1402, an environment associated with the problem version of the application 110 and the environment associated with the operational version of the application 110 is accessed.

At block 1404, a number of environment attributes associated with the problem version is compared to the number of environment attributes associated with the operational version to determine an environmental change (e.g., an identified change).

Figure 15:
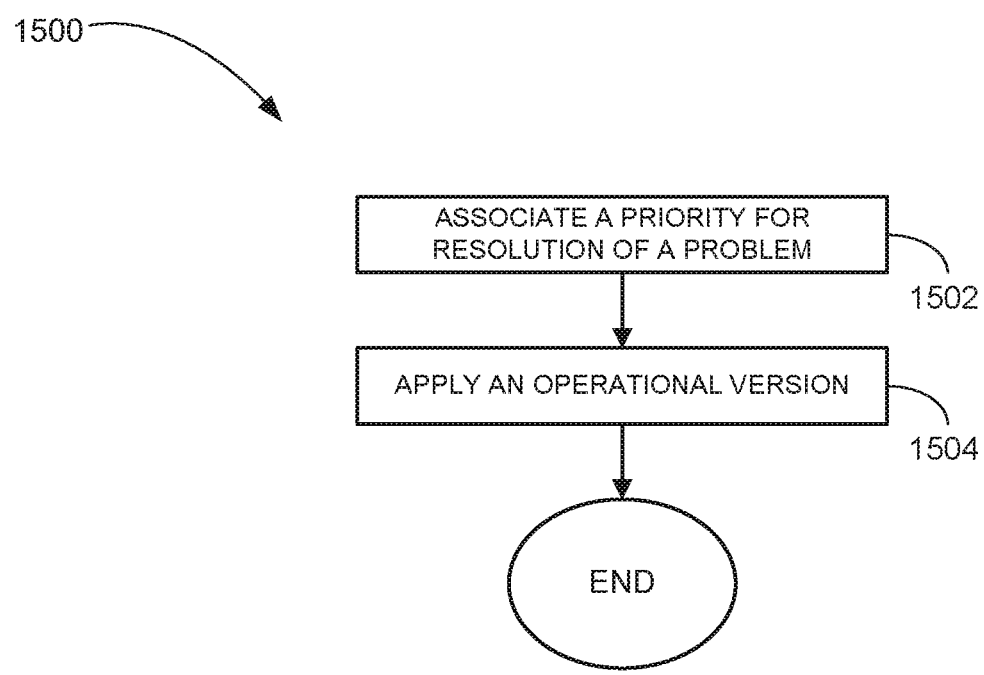
FIG. 15 is a flowchart illustrating a method for modifying according to an example embodiment.

FIG. 15 illustrates a method 1500 for modifying according to an example embodiment. The method 1500 may be performed at block 612 or otherwise performed.

A priority for resolution of the problem is associated at block 1502. The notifying of the person during the operations at block 610 (see FIG. 6) may include the priority for resolution.

The operational version of the application 110 may be applied at block 1502. For example, the application 110 may be rolled back or rolled forward from the problem version to the operational version at block 1502. In an example embodiment, the rolling back or rolling forward may be based on the priority for resolution. The notification provided to the user may include an indication of the rolling back or rolling forward of the application 110.

Figure 16:
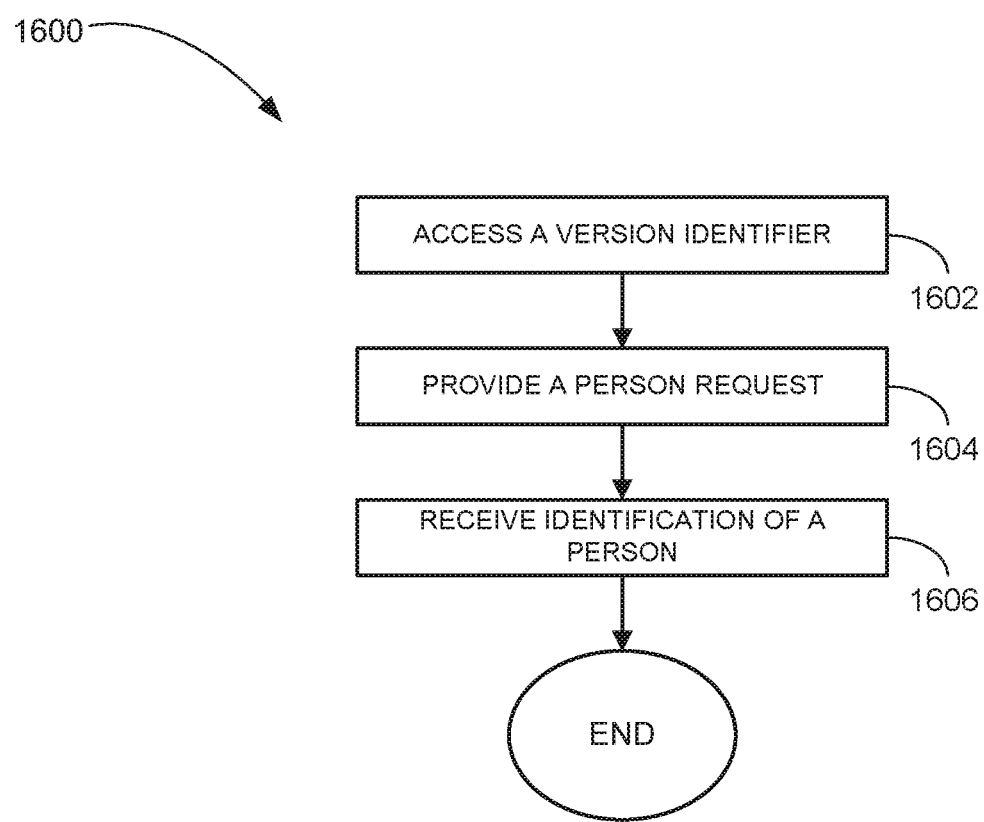
FIG. 16 is a flowchart illustrating a method for determining a person according to an example embodiment.

FIG. 16 illustrates a method 1600 for determining a person according to an example embodiment. The method 1600 may be performed at block 606 (see FIG. 6) or otherwise performed.

A version identifier associated with the problem version of the application 110 is accessed at block 1602.

A person request is provided to the versioning application 114 at block 1604. The person request may include the version identifier and/or a method that has been changed by the person.

At block 1606, identification of the person may be received from the versioning application 114.

Figure 17:
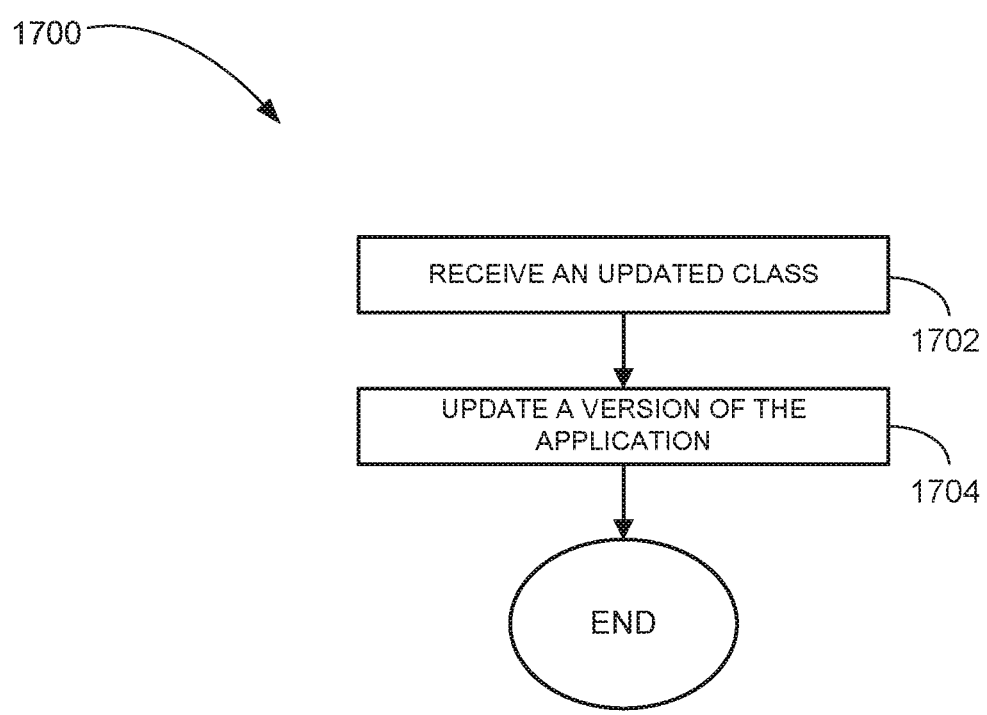
FIGS. 17-19 are flowcharts illustrating methods for modifying according to an example embodiment.

FIG. 17 illustrates a method 1700 for modifying according to an example embodiment. The method 1700 may be performed at block 612 (see FIG. 6) or otherwise performed.

An updated class of the application 110 is received for a problem version of the application 110 at block 1702.

A version of the application is updated at block 1704. For example, the updated class may be hot swapped into the problem version of the application 110 at block 1704.

Figure 18:
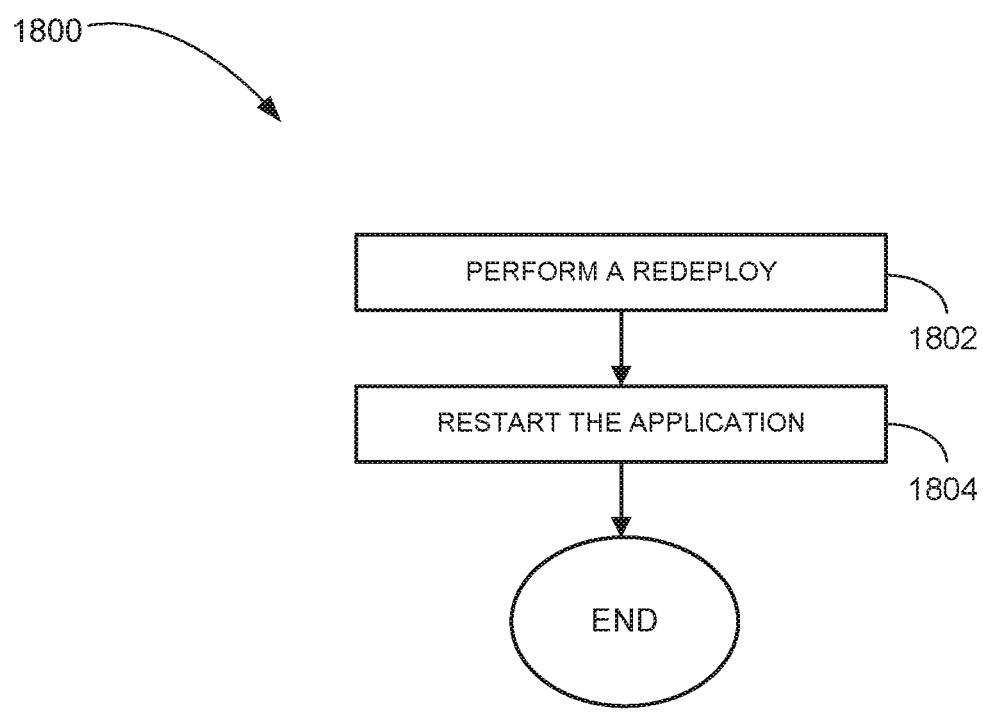

FIG. 18 illustrates a method 1800 for modifying according to an example embodiment. The method 1800 may be performed at block 612 (see FIG. 6) or otherwise performed.

A redeploy is performed on the class of the application 110 and/or the application 110 at block 1802. The application 110 is then restarted at block 1804.

Figure 19:
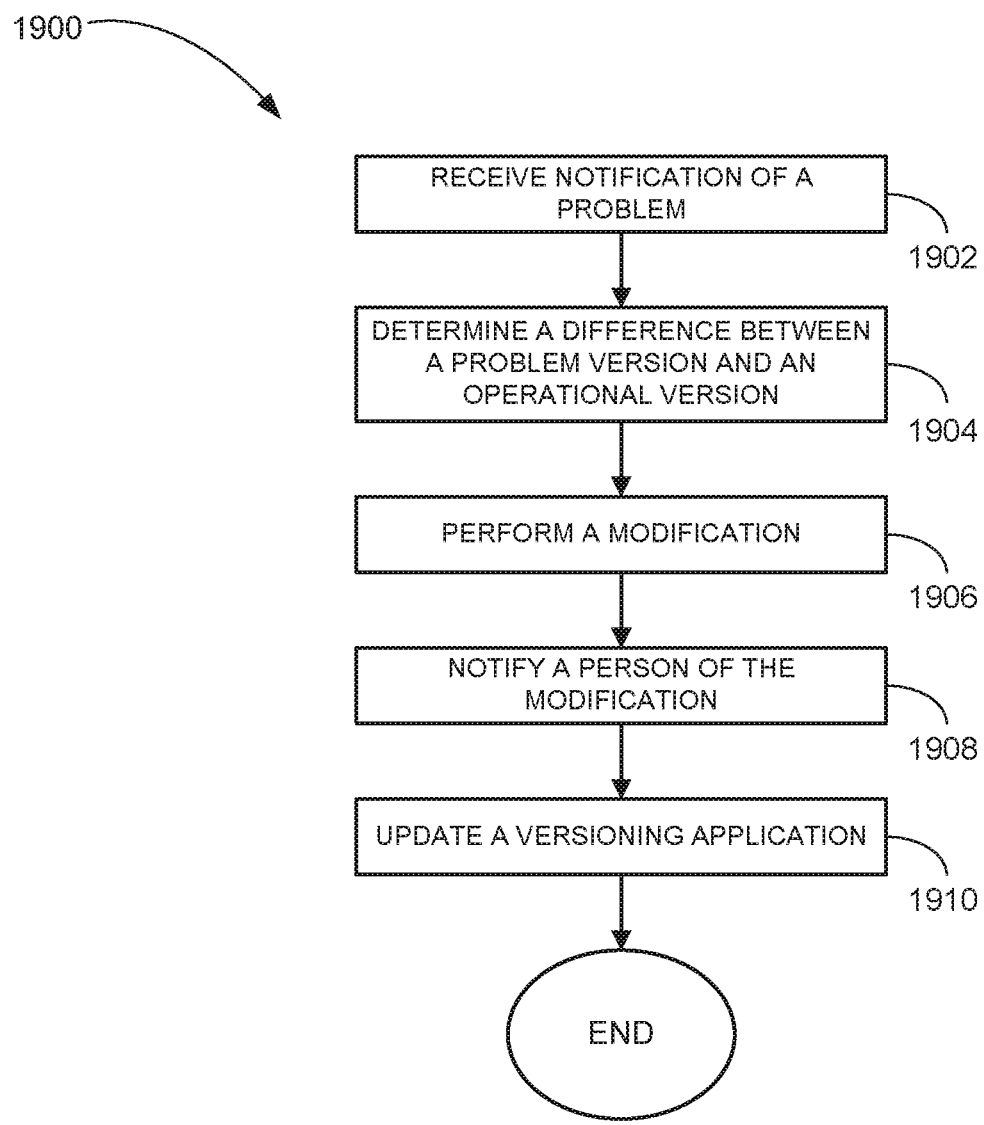

FIG. 19 illustrates a method 1900 for modifying according to an example embodiment. The method 1900 may be performed by the analyzer 108 (see FIG. 1) or another application in the system 100 or another system.

Notification of a problem associated with the application 110 is received at block 1902. The operations performed at block 1902 may include the operations performed at block 602 (see FIG. 6).

At block 1904, a difference between a problem version of the application 110 and an operational version of the application 110 is determined to identify a change associated with the problem. The operations performed at block 1904 may include the operations performed at block 604 (see FIG. 6).

A modification is performed to resolve the problem associated with the change based on the determining of the difference at block 1906. For example, the modification may include modifying an environment of a machine operating the problem version of the application 110 to resolve the problem associated with the change.

A person associated with the change may be notified of the modification at block 1908.

The versioning application 114 may be updated based on the performing of the modification at block 1910.

Figure 20:
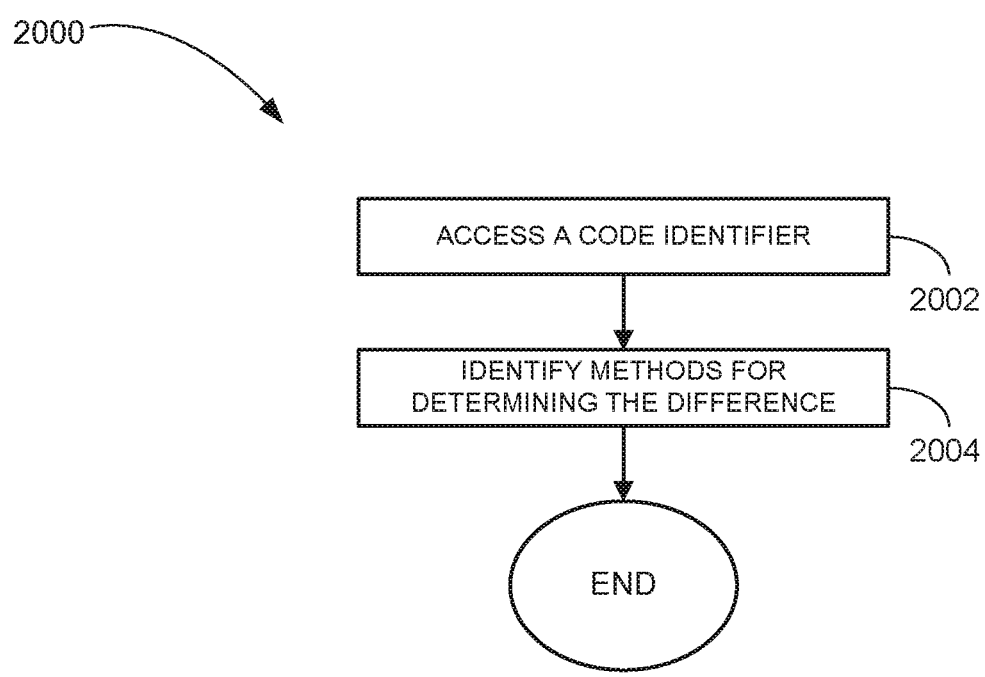
FIG. 20 is a flowchart illustrating a method for determining a method difference according to an example embodiment.

FIG. 20 illustrates a method 2000 for determining a method difference according to an example embodiment. The method 2000 may be performed at block 702 (see FIG. 7) or otherwise performed.

A code identifier is accessed for a method of the sequence of methods at block 2002. The code identifier may include a name of a method, parameter types associated with the method, and a return value of the method. The code identifier may be in the header of the method. Other types of code identifiers may also be used.

At block 2004, a number of methods are identified for the determining of the difference based on use of the code identifier.

Figure 21:
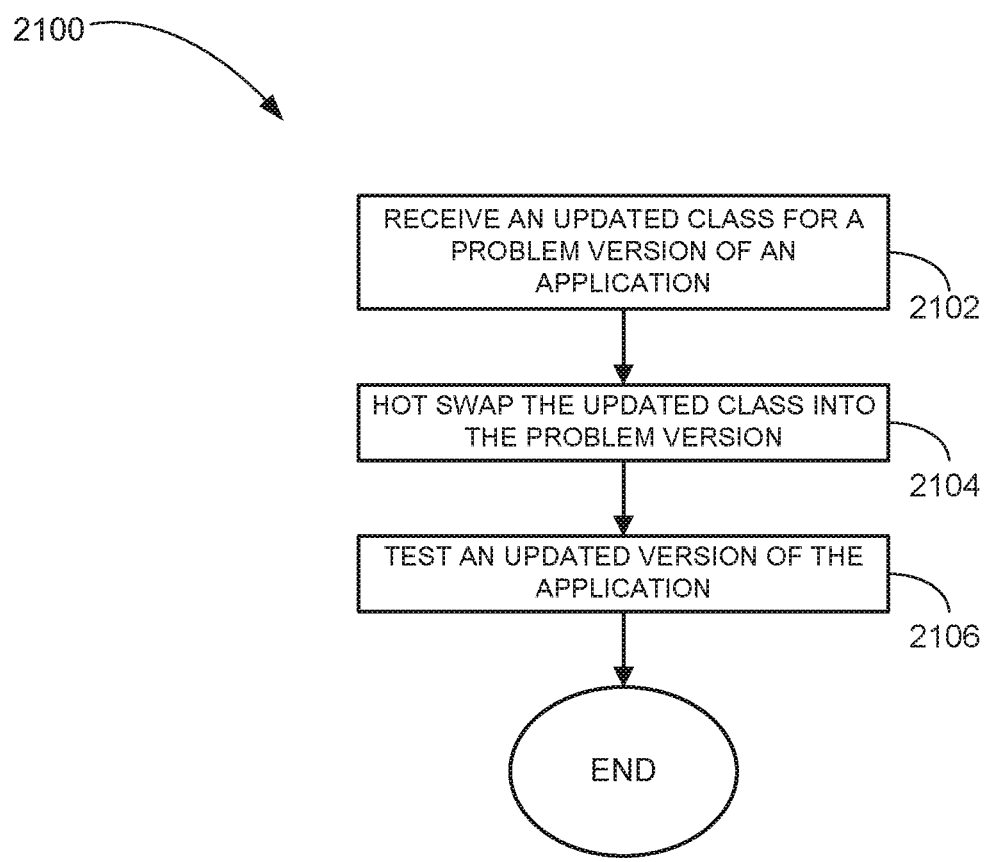
FIG. 21 is a flowchart illustrating a method for modifying according to an example embodiment.

FIG. 21 illustrates a method 2100 for modifying according to an example embodiment. The method 2100 may be performed at block 1906 (see FIG. 19) or otherwise performed.

An updated class is received for the problem version of the application at block 2102. The updated class may be hot swapped into the problem version of the application 110 at block 2104 to create an updated version of the application 110. At block 2106, the updated version of the application 110 may be tested to determine whether the updated version is fixed, includes an existing problem and/or created a new problem.

Figure 22:
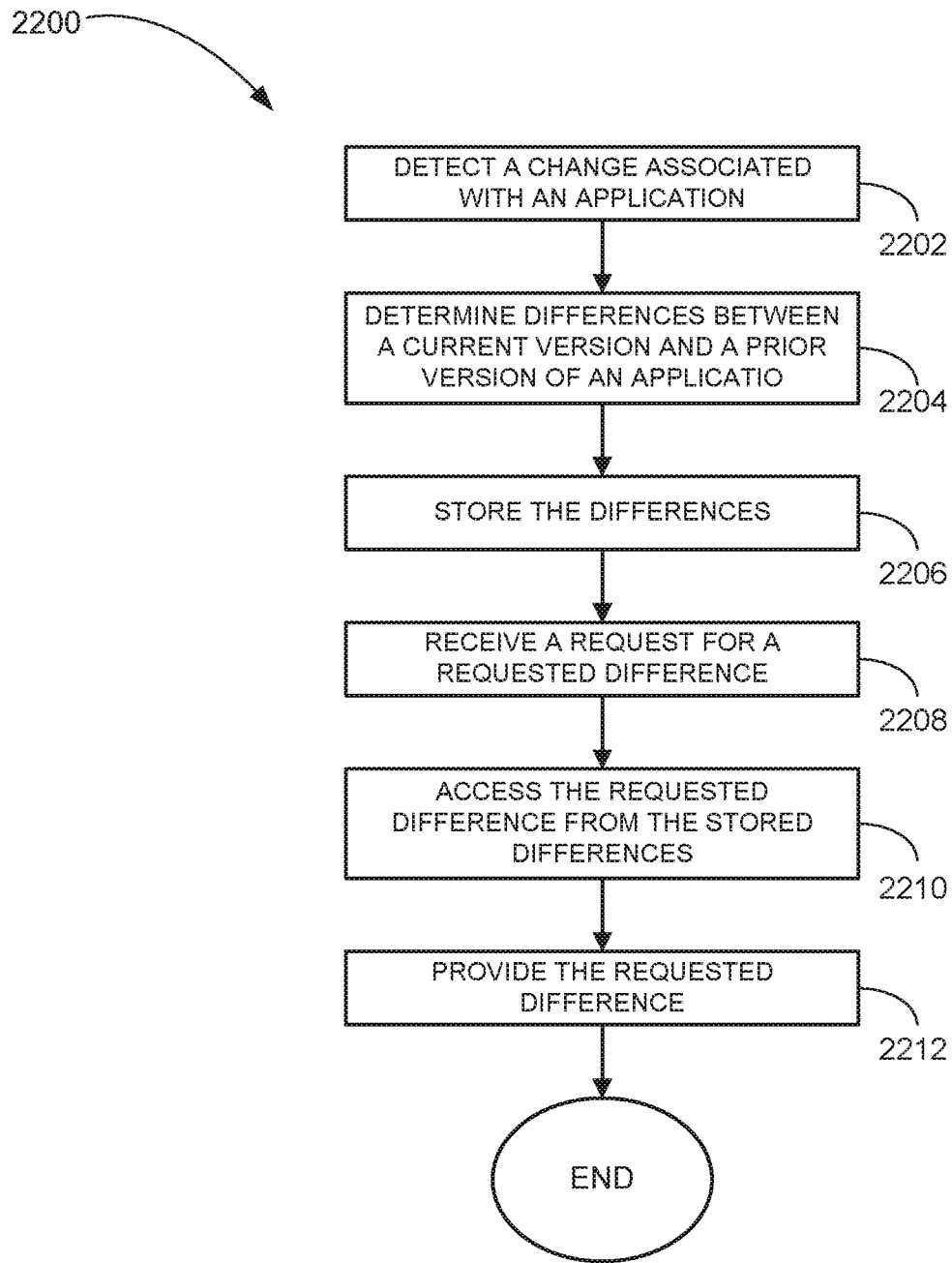
FIG. 22 is a flowchart illustrating a method for difference providing according to an example embodiment.

FIG. 22 illustrates a method 2200 for difference providing according to an example embodiment. The method 2200 may be performed by the continuous materialized differentiator 116 (see FIG. 1) or another application in the system 100 or another system.

A change associated with the application 110 is detected at block 2202.

A number of differences between a current version of the application 110 and a prior version of the application 110 associated with the change are determined at block 2204. The differences may include, by way of example, a method difference, a file difference, an environmental difference, a database difference, a network difference, or an operating system difference. Other differences may also be determined.

The differences are stored in the database 120 as materialized differences 122 at block 2206. The differences may be stored with a code identifier and/or a version identifier.

A request for a difference is received at block 2208.

At block 2210, the requested difference is accessed from the materialized differences 122.

The requested difference is provided in response to the receiving of the request at block 2212.

Figure 23:
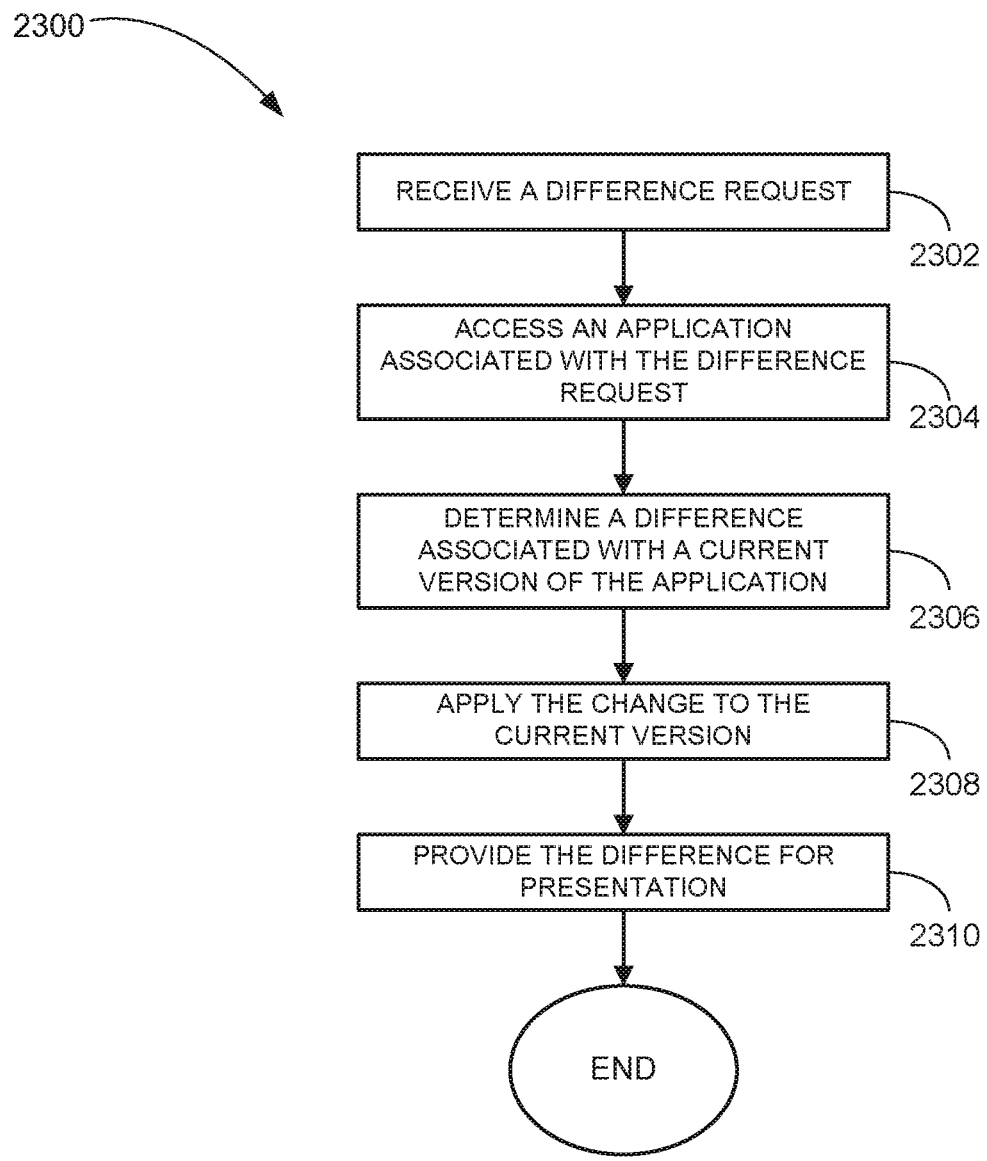
FIG. 23 is a flowchart illustrating a method for user interacting according to an example embodiment.

FIG. 23 illustrates a method 2300 for user interaction according to an example embodiment. The method 2300 may be performed by the interfacing application 118 (see FIG. 1) or another application in the system 100 or another system.

A difference request is received through a user interface (e.g., of the client machine 102) at block 2302.

The application 110 associated with the difference request is accessed at block 2304. The application 110 may include an output on the user interface from which the difference request was received.

A difference associated with a current version of the application 110 and a previous version of the application 110 is determined at block 2306.

The change may be applied to the current version of the application 110 at block 2308. The change may be applied, by way of example, by rolling the application back or rolling the application forward.

The difference may be provided for presentation at block 2310. The difference may be provided back to the user interface, to a person associated with the application 110 (e.g., an administrator), or otherwise provided.

Figure 24A:
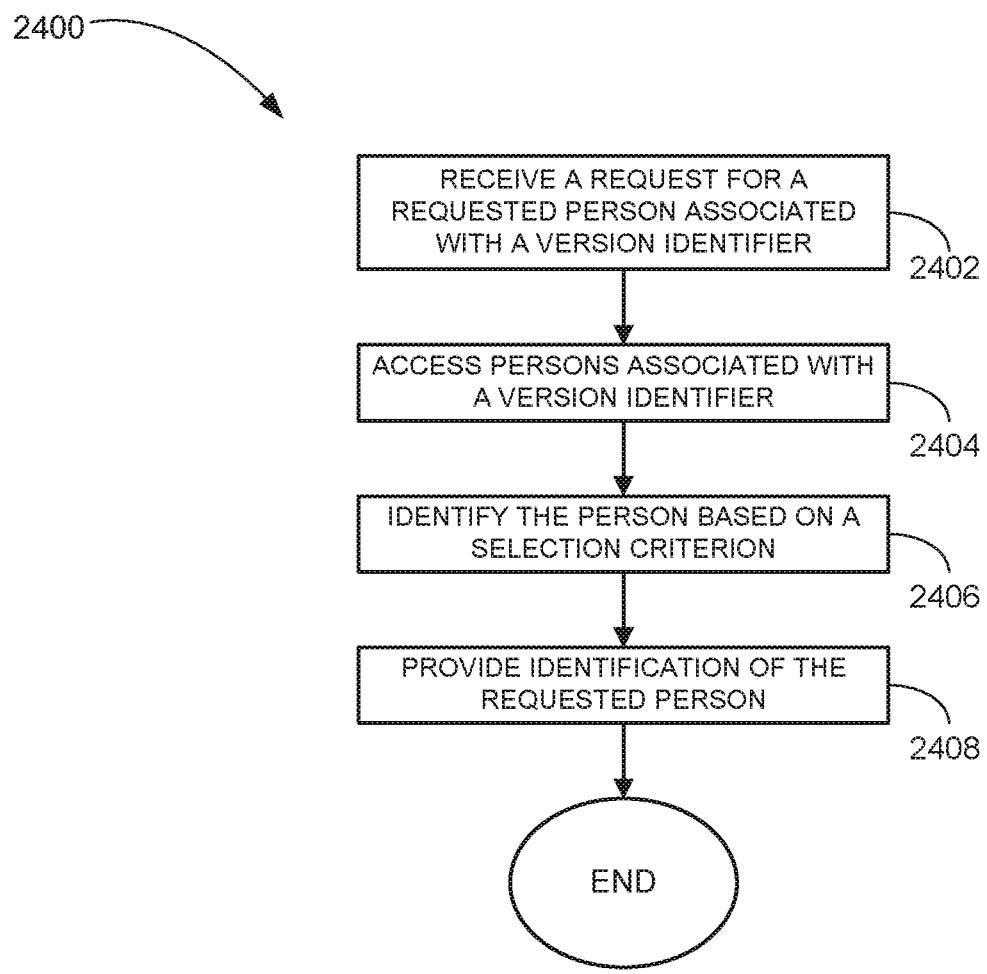
FIG. 24A is a flowchart illustrating a method for identification providing according to an example embodiment.

FIG. 24A illustrates a method 2400 for identification providing according to an example embodiment. The method 2400 may be performed by the versioning application 114 (see FIG. 1) or another application in the system 100 or another system.

At block 2402, a request for a requested person associated with a version identifier of an application is received.

A number of persons associated with the version identifier are accessed at block 2404.

The requested person is identified from the persons based on a selection criterion at block 2406. The selection criterion may include, by way of example, a greatest number of changes to the application, a greatest knowledge of the application, association with a last method change in a sequence of methods, association with a first method change in the sequence of methods, association with a method change in the sequence of methods occurring before detection of the exception, and/or a manual examination of the change. Other selection criteria may also be used.

Identification of the requested person is provided at block 2408.

Figure 24B:
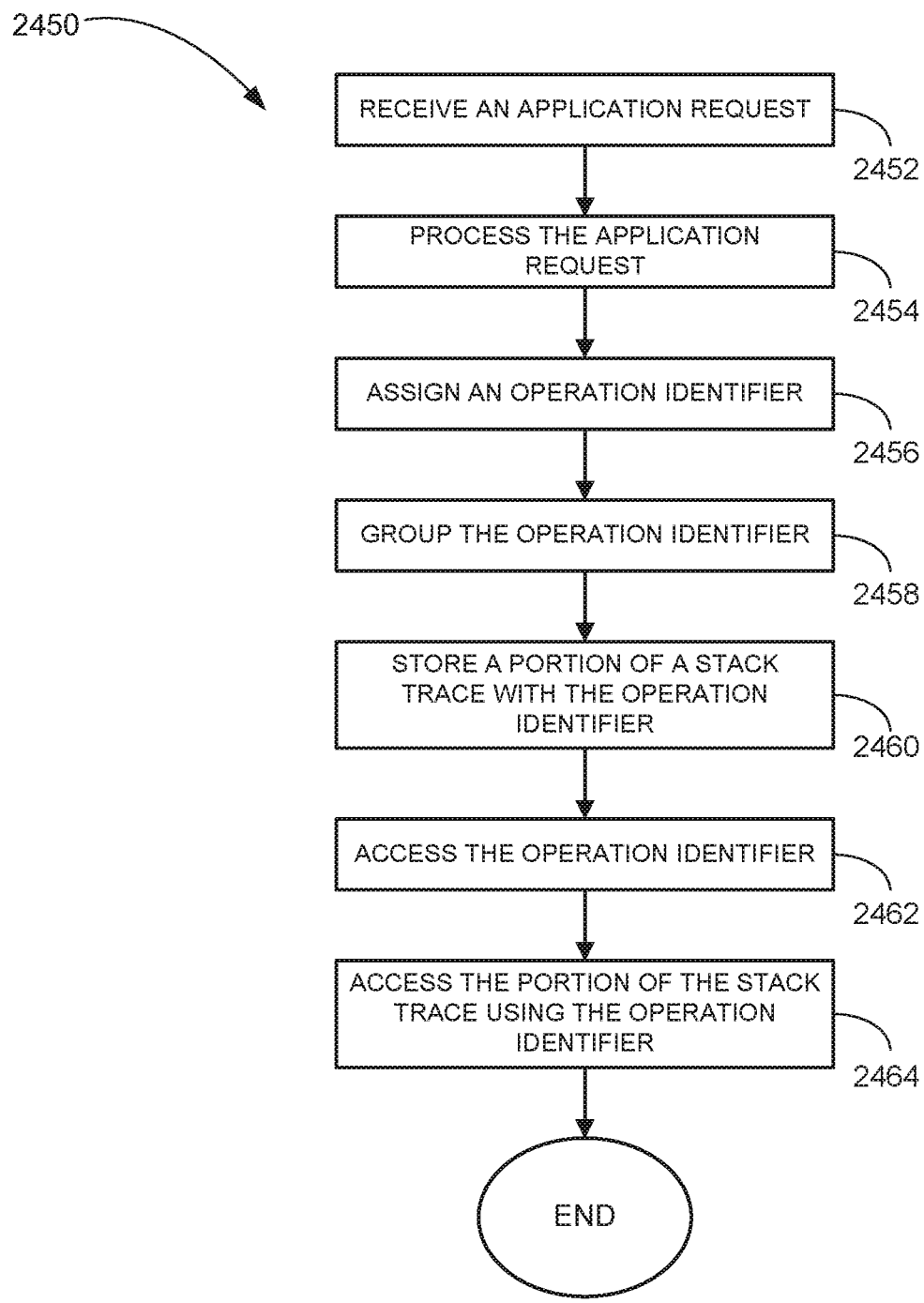
FIG. 24B is a flowchart illustrating a method for storing a stack trace according to an example embodiment.

FIG. 24B illustrates a method 2450 for storing a stack trace according to an example embodiment. The method 2450 may be performed by the analyzer 108 (see FIG. 1) or otherwise performed.

An application request for the application 110 may be received at block 2452.

The application request may be processed by the application 110 at block 2454.

An operation identifier may be assigned with the processing of the application request at block 2456. The operation identifier may be capable of identifying a portion of the stack trace associated with the processing of the application request.

The operation identifier may be grouped with a number of additional identifiers at block 2458. The additional identifiers may be associated with one or more additional applications. The additional applications may be associated with the application request. For example, during the operations of a listing application operations may also occur with a billing application.

The portion of the stack trace may be stored with the operation identifier at block 2460. The portion of the stack trace may be capable of being retrieved using the operation identifier.

The operation identifier may be accessed at block 2462. For example, the operation identifier may be receiving from a user interface and/or through the sending of the operation identifier from the application 110 to the user interface in response to a user request. The operation identifier may be accessed in other ways.

The portion of the stack trace may be accessed using the operation identifier at block 2464.

Figure 25:
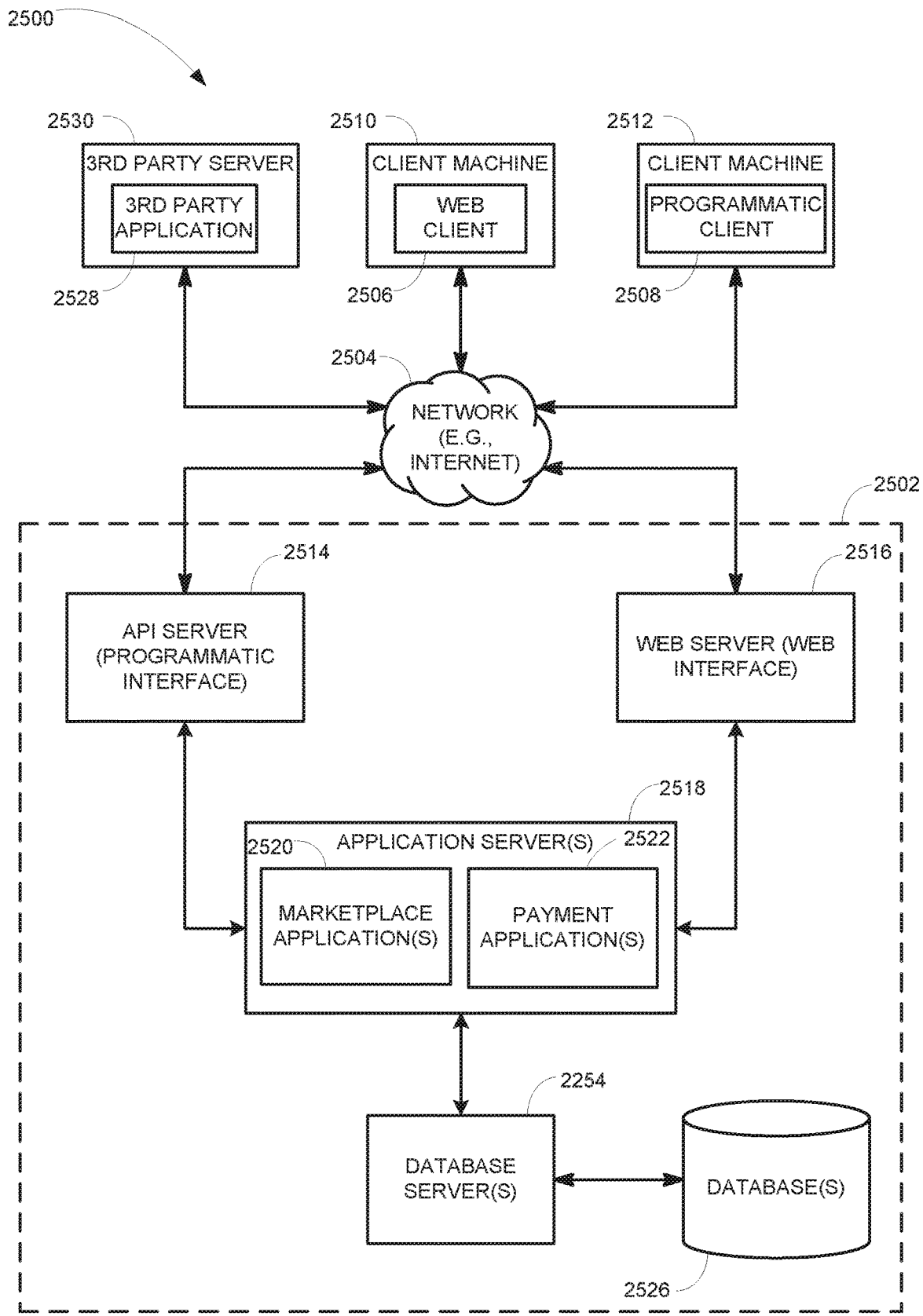
FIG. 25 is a network diagram depicting a network system, according to one embodiment, having a client server architecture configured for exchanging data over a network.

FIG. 25 is a network diagram depicting a client-server system 2500, within which one example embodiment may be deployed. By way of example, a network 2504 may include the functionality of the network 104, the servers 106 may be deployed within an application server 2518, the client machine 102 may include the functionality of a client machine 2510 or a client machine 2512, and a database 2526 may include the functionality of the database 120. The system 100 may also be deployed in other systems.

A networked system 2502, in the example forms of a network-based marketplace or publication system, provides server-side functionality, via a network 2504 (e.g., the Internet or Wide Area Network (WAN)) to one or more clients. FIG. 25 illustrates, for example, a web client 2506 (e.g., a browser, such as the Internet Explorer browser developed by Microsoft Corporation of Redmond, Wash. State), and a programmatic client 2508 executing on respective client machines 2510 and 2512.

An Application Program Interface (API) server 2514 and a web server 2516 are coupled to, and provide programmatic and web interfaces respectively to, one or more application servers 2518. The application servers 2518 host one or more marketplace applications 2520 and authentication providers 2522. The application servers 2518 are, in turn, shown to be coupled to one or more databases servers 2524 that facilitate access to one or more databases 2526.

The marketplace applications 2520 may provide a number of marketplace functions and services to users that access the networked system 2502. The authentication providers 2522 may likewise provide a number of payment services and functions to users. The authentication providers 2522 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 2520. While the marketplace and authentication providers 2520 and 2522 are shown in FIG. 25 to both form part of the networked system 2502, in alternative embodiments the authentication providers 2522 may form part of a payment service that is separate and distinct from the networked system 2502.

Further, while the system 2500 shown in FIG. 25 employs a client-server architecture, the present invention is of course not limited to such an architecture, and could equally well find application in a distributed, or peer-to-peer, architecture system, for example. The various marketplace and authentication providers 2520 and 2522 could also be implemented as standalone software programs, which need not have networking capabilities.

The web client 2506 accesses the various marketplace and authentication providers 2520 and 2522 via the web interface supported by the web server 2516. Similarly, the programmatic client 2508 accesses the various services and functions provided by the marketplace and authentication providers 2520 and 2522 via the programmatic interface provided by the API server 2514. The programmatic client 2508 may, for example, be a seller application (e.g., the TurboLister™ application developed by eBay Inc., of San Jose, Calif.) to enable sellers to author and manage listings on the networked system 2502 in an off-line manner, and to perform batch-mode communications between the programmatic client 2508 and the networked system 2502.

FIG. 25 also illustrates a third party application 2528, executing on a third party server machine 2260, as having programmatic access to the networked system 2502 via the programmatic interface provided by the API server 2514. For example, the third party application 2528 may, utilizing information retrieved from the networked system 2502, support one or more features or functions on a website hosted by the third party. The third party may, for example, provide one or more promotional, marketplace or payment functions that are supported by the relevant applications of the networked system 2502.

Figure 26:
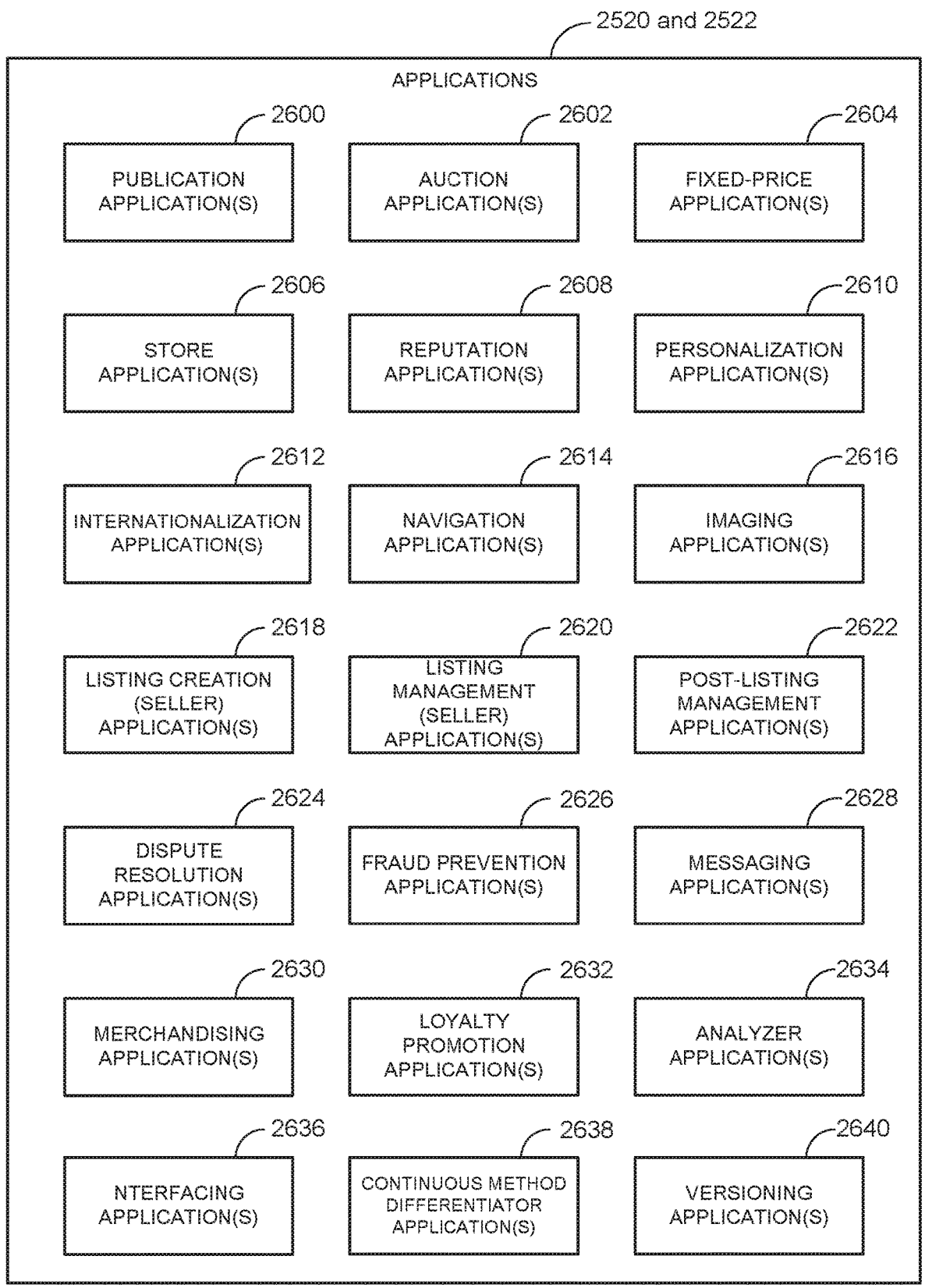
FIG. 26 is a block diagram illustrating an example embodiment of multiple network and marketplace applications, which are provided as part of the network-based marketplace.

FIG. 26 is a block diagram illustrating multiple applications 2520 and 2522 that, in one example embodiment, are provided as part of the networked system 2502 (see FIG. 25). The applications 2520 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 2526 via the database servers 2524.

The networked system 2502 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 2520 are shown to include at least one publication application 2600 and one or more auction applications 2602 which support auction-format listing and price setting mechanisms (e.g., English, Dutch, Vickrey, Chinese, Double, Reverse auctions etc.). The various auction applications 2602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 2604 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 2606 allow a seller to group listings within a "virtual" store, which may be branded and otherwise personalized by and for the seller. Such a virtual store may also offer promotions, incentives and features that are specific and personalized to a relevant seller.

Reputation applications 2608 allow users that transact, utilizing the networked system 2502, to establish, build and maintain reputations, which may be made available and published to potential trading partners. Consider that where, for example, the networked system 2502 supports person-to-person trading, users may otherwise have no history or other reference information whereby the trustworthiness and credibility of potential trading partners may be assessed. The reputation applications 2608 allow a user, for example through feedback provided by other transaction partners, to establish a reputation within the networked system 2502 over time. Other potential trading partners may then reference such a reputation for the purposes of assessing credibility and trustworthiness.

Personalization applications 2610 allow users of the networked system 2502 to personalize various aspects of their interactions with the networked system 2502. For example a user may, utilizing an appropriate personalization application 2610, create a personalized reference page at which information regarding transactions to which the user is (or has been) a party may be viewed. Further, a personalization application 2610 may enable a user to personalize listings and other aspects of their interactions with the networked system 2502 and other parties.

The networked system 2502 may support a number of marketplaces that are customized, for example, for specific geographic regions. A version of the networked system 2502 may be customized for the United Kingdom, whereas another version of the networked system 2502 may be customized for the United States. Each of these versions may operate as an independent marketplace, or may be customized (or internationalized and/or localized) presentations of a common underlying marketplace. The networked system 2502 may accordingly include a number of internationalization applications 2612 that customize information (and/or the presentation of information) by the networked system 2502 according to predetermined criteria (e.g., geographic, demographic or marketplace criteria). For example, the internationalization applications 2612 may be used to support the customization of information for a number of regional websites that are operated by the networked system 2502 and that are accessible via respective web servers 2516.

Navigation of the networked system 2502 may be facilitated by one or more navigation applications 2614. For example, a search application (as an example of a navigation application) may enable key word searches of listings published via the networked system 2502. A browse application may allow users to browse various category, catalogue, or system inventory structures according to which listings may be classified within the networked system 2502. Various other navigation applications may be provided to supplement the search and browsing applications.

In order to make listings available via the networked system 2502 as visually informing and attractive as possible, the marketplace applications 2520 may include one or more imaging applications 2616 utilizing which users may upload images for inclusion within listings. An imaging application 2616 also operates to incorporate images within viewed listings. The imaging applications 2616 may also support one or more promotional features, such as image galleries that are presented to potential buyers. For example, sellers may pay an additional fee to have an image included within a gallery of images for promoted items.

Listing creation applications 2618 allow sellers conveniently to author listings pertaining to goods or services that they wish to transact via the networked system 2502, and listing management applications 2620 allow sellers to manage such listings. Specifically, where a particular seller has authored and/or published a large number of listings, the management of such listings may present a challenge. The listing management applications 2620 provide a number of features (e.g., auto-relisting, inventory level monitors, etc.) to assist the seller in managing such listings. One or more post-listing management applications 2622 also assist sellers with a number of activities that typically occur post-listing. For example, upon completion of an auction facilitated by one or more auction applications 2602, a seller may wish to leave feedback regarding a particular buyer. To this end, a post-listing management application 2622 may provide an interface to one or more reputation applications 2608, so as to allow the seller conveniently to provide feedback regarding multiple buyers to the reputation applications 2608.

Dispute resolution applications 2624 provide mechanisms whereby disputes arising between transacting parties may be resolved. For example, the dispute resolution applications 2624 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 2626 implement fraud detection and prevention mechanisms to reduce the occurrence of fraud within the networked system 2502.

Messaging applications 2628 are responsible for the generation and delivery of messages to users of the networked system 2502, such messages for example advising users regarding the status of listings at the networked system 2502 (e.g., providing "outbid" notices to bidders during an auction process or to provide promotional and merchandising information to users). Respective messaging applications 2628 may utilize any one have a number of message delivery networks and platforms to deliver messages to users. For example, messaging applications 2628 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 2630 support various merchandising functions that are made available to sellers to enable sellers to increase sales via the networked system 2502. The merchandising applications 2630 also operate the various merchandising features that may be invoked by sellers, and may monitor and track the success of merchandising strategies employed by sellers.

The networked system 2502 itself, or one or more parties that transact via the networked system 2502, may operate loyalty programs that are supported by one or more loyalty/promotions applications 2632. For example, a buyer may earn loyalty or promotions points for each transaction established and/or concluded with a particular seller, and may be offered a reward for which accumulated loyalty points can be redeemed.

The analyzer application 2634 may determine whether a problem has occurred in the network system 2502, notify a person regarding the problem, and/or resolve the problem. The analyzer application 2634 may include the functionality of the analyzer 108 (see FIG. 1).

The interfacing application 2636 receives a difference request and provides a difference for presentation. The interfacing application 2266 may include the functionality of the interfacing application 118 (see FIG. 1).

The continuous materialized differentiator application 2268 may determine and stored the differences of the application 2600-2638 in the database 120. The continuous materialized differentiator application 2268 may include the functionality of the continuous materialized differentiator 116 (see FIG. 1).

The versioning application 2240 may track the versioning of the applications 2600-2638. The versioning application 2640 may include the functionality of the versioning application 114 (see FIG. 1).

Figure 27:
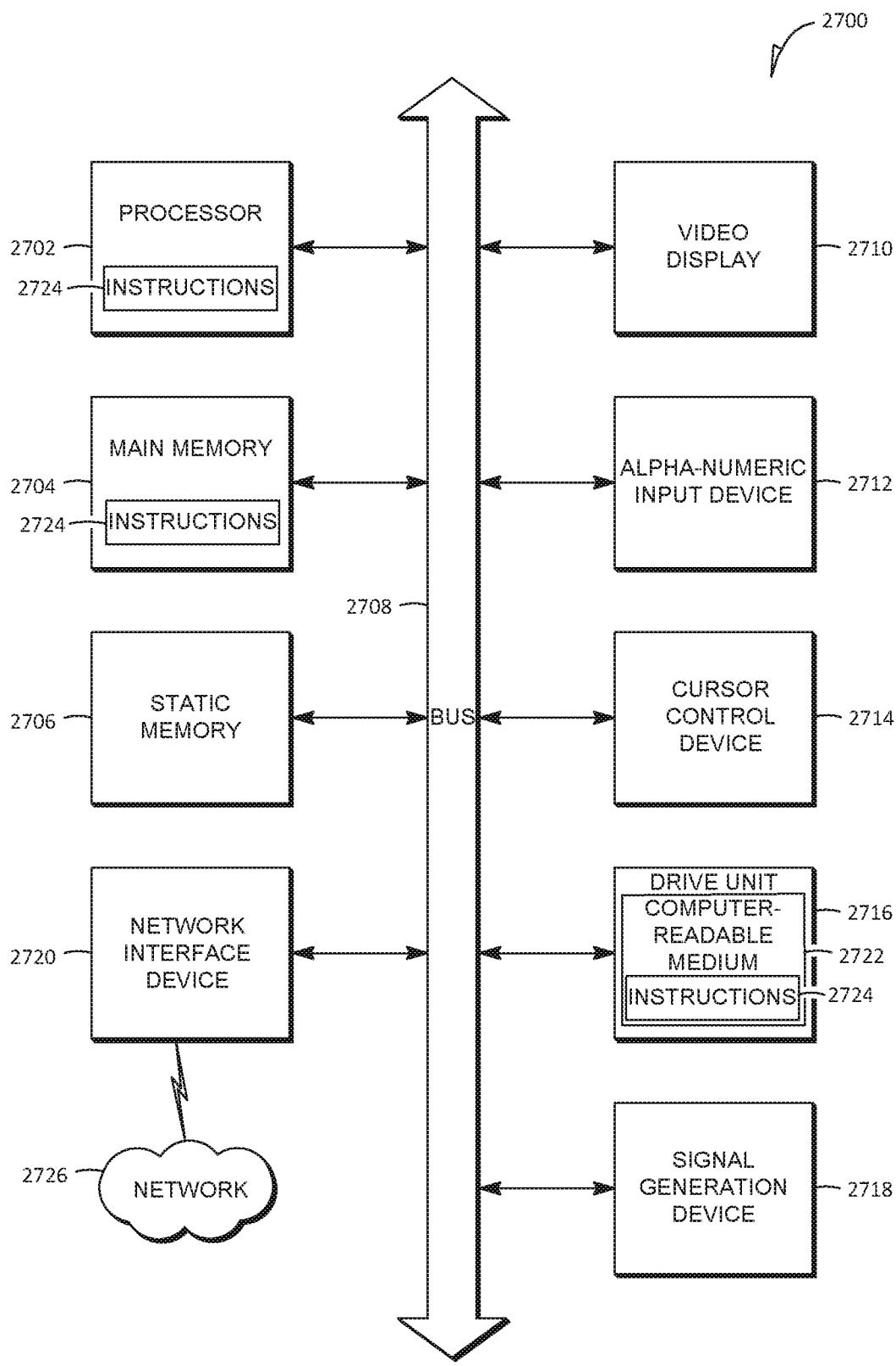
FIG. 27 is a block diagram diagrammatic representation of machine in the example form of a computer system within which a set of instructions for causing the machine to perform any one or more of the methodologies discussed herein may be executed.

FIG. 27 shows a diagrammatic representation of machine in the example form of a computer system 2700 within which a set of instructions may be executed causing the machine to perform any one or more of the methods, processes, operations, or methodologies discussed herein. The servers 106 may operate on or more computer systems 2700 and/or the client machine 102 may include the functionality of the computer system 2700.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2700 includes a processor 2702 (e.g., a central processing unit (CPU) a graphics processing unit (GPU) or both), a main memory 2704 and a static memory 2706, which communicate with each other via a bus 2708. The computer system 2700 may further include a video display unit 2710 (e.g., a liquid crystal display (LCD) or a cathode ray tube (CRT)). The computer system 2700 also includes an alphanumeric input device 2712 (e.g., a keyboard), a cursor control device 2714 (e.g., a mouse), a drive unit 2716, a signal generation device 2718 (e.g., a speaker) and a network interface device 2720.

The drive unit 2716 includes a machine-readable medium 2722 on which is stored one or more sets of instructions (e.g., software 2724) embodying any one or more of the methodologies or functions described herein. The software 2724 may also reside, completely or at least partially, within the main memory 2704 and/or within the processor 2702 during execution thereof by the computer system 2700, the main memory 2704 and the processor 2702 also constituting machine-readable media.

The software 2724 may further be transmitted or received over a network 2726 via the network interface device 2720.

While the machine-readable medium 2722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for problem notification and processing have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, at a computer, a run-time stack trace of a first version of an application based on an exception;
   determining, by the computer, based on the run-time stack trace for the exception, a change to a code between the first version of the application and a second version of the application;
   determining, by the computer, a developer identity associated with the change to the code; and
   causing a display of a user interface; the user interface indicating the change to the code and the developer identity.

2. The method of claim 1, wherein the change is to at least one file in the code.

3. The method of claim 2, wherein the at least one file is included in the stack trace.

4. The method of claim 3, further comprising sending a notification to the developer.

5. The method of claim 1, wherein the user interface includes a link to the stack trace.

6. The method of claim 1, wherein the change to the code is a change to one of a source code, a compiled code, or a bytecode.

7. The method of claim 1, wherein the change to the code comprises at least one of a file difference, a method difference, or a class difference.

8. An apparatus comprising:
   hardware processing circuitry;
   hardware memory storing instructions that when executed configure the hardware processing circuitry to perform operations comprising:
   receiving run-time stack trace of a first version of an application based on an exception;
   determining, based on the run-time stack trace for the exception, a change to a code between the first version of the application and a second version of the application;
   determining a developer identity associated with the change to the code; and
   displaying a user interface, the user interface indicating the change to the code and the developer identity.

9. The apparatus of claim 8, wherein the change is to at east one file in the code.

10. The apparatus of claim 9, therein the at east one file is included in the stack trace.

11. The apparatus of claim 10, the operations further comprise sending a notification to the developer.

12. The apparatus of claim 8, wherein the user interface includes a link to the stack trace.

13. The apparatus of claim 8, wherein the change to the code is a change to one of a source code, a compiled code, or a bytecode.

14. The apparatus of claim 8, wherein the change to the code comprises at least one of a file difference, a method difference, or a class difference.

15. A non-transitory computer readable storage medium comprising instructions that when executed configure hardware processing circuitry to perform operations comprising:
   receiving run-time stack trace of a first version of an application based on an exception;
   determining, based on the run-time stack trace for the exception, a change to a code between the first version of the application and a second version of the application;
   determining a developer identity associated with the change to the code; and
   displaying a user interface, the user interface indicating the change to the code and the developer identity.

16. The non-transitory computer readable storage medium of claim 15, wherein the change is to at least one file in the code.

17. The non-transitory computer readable storage medium of claim 16, wherein the at least one file is included in the stack trace.

18. The non-transitory computer readable storage medium of claim 17, wherein the operations further comprise sending a notification to the developer.

19. The non-transitory computer readable storage medium of claim 15, wherein the user interface includes a link to the stack trace.

20. The non-transitory computer readable storage medium of claim 15, wherein the change to the code is a change to one of a source code, a compiled code, or a bytecode.

* * * * *